United States Patent
Carew-Hopkins

(10) Patent No.: US 11,636,145 B2
(45) Date of Patent: Apr. 25, 2023

(54) ONLINE ARTWORK GALLERY SYSTEMS AND METHODS

(71) Applicant: Brian Carew-Hopkins, Perth (AU)

(72) Inventor: Brian Carew-Hopkins, Perth (AU)

( * ) Notice: Subject to any disclaimer, the term of this patent is extended or adjusted under 35 U.S.C. 154(b) by 0 days.

(21) Appl. No.: 16/083,474

(22) PCT Filed: Mar. 2, 2017

(86) PCT No.: PCT/AU2017/050183
§ 371 (c)(1),
(2) Date: Sep. 7, 2018

(87) PCT Pub. No.: WO2017/152218
PCT Pub. Date: Sep. 14, 2017

(65) Prior Publication Data
US 2019/0073367 A1    Mar. 7, 2019

(30) Foreign Application Priority Data
Mar. 9, 2016  (AU) .............................. 2016900881

(51) Int. Cl.
*G06F 16/44*    (2019.01)
*G06T 11/60*    (2006.01)
(Continued)

(52) U.S. Cl.
CPC ........ *G06F 16/447* (2019.01); *G06F 3/04845* (2013.01); *G06F 16/48* (2019.01);
(Continued)

(58) Field of Classification Search
CPC ...... G06K 9/34; G06K 9/4604; G06K 9/6209; G06K 9/6215; G06K 9/00617;
(Continued)

(56) References Cited

U.S. PATENT DOCUMENTS 7,674,747 B1   3/2010 Long
8,817,043 B2   8/2014 Nemeth et al.
(Continued)

FOREIGN PATENT DOCUMENTS

AU   2020102644 A4   1/2021
AU   2017231090 B2   11/2021

OTHER PUBLICATIONS

'Van Gogh Controversy—Hidden Images in Van Gogh's Art' [retrieved from the internet on Apr. 20, 2017] (URL: http://www.vangoghcontrovery.com/Hiddenimages.htm). Published in 2007, pp. 1-31.

(Continued)

*Primary Examiner* — Justin R. Blaufeld
(74) *Attorney, Agent, or Firm* — Intellectual Property Law Group LLP

(57) ABSTRACT

In one preferred form of the present invention, there is provided a computer implemented art gallery system (10) for use by a community of users (12), the system (10) comprising: a data collector (14) for storing representations (16) of artworks (18) that have been created by artists; and a timeline facility (20) configured for attempting to ensure that, upon user requests (22) for representations (16) of the artworks (18), each representation (16) corresponding with a respective one of the artworks (18) is able to be used to provide a time line reveal (26) of a special component (28) of the corresponding artwork (18); the special component (28) of each artwork (18) comprising a hidden or inconspicuous component of the artwork (18).

20 Claims, 14 Drawing Sheets

(51) Int. Cl.
*G06F 16/48* (2019.01)
*G06F 3/04845* (2022.01)
*G06Q 50/00* (2012.01)
*G09B 11/10* (2006.01)

(52) U.S. Cl.
CPC .............. *G06Q 50/01* (2013.01); *G06T 11/60* (2013.01); *G09B 11/10* (2013.01)

(58) Field of Classification Search
CPC ........ G06K 9/00671; G06K 2009/6213; G06T 7/11; G06T 7/74; G06T 7/80; G06T 7/0002; G06T 19/003; G06T 19/20; G06T 2207/30168; G06T 11/60; H04W 4/02; H04W 4/025; H04W 4/029; G02B 2027/014; G06F 16/447; G06F 3/04845; G06F 16/48; G06Q 50/01; G09B 11/10
See application file for complete search history.

(56) References Cited

U.S. PATENT DOCUMENTS

| | | | | |
|---|---|---|---|---|
| 10,290,036 B1* | 5/2019 | Gella | ................. | G06Q 30/0623 |
| 2004/0004737 A1* | 1/2004 | Kahn | ................. | H04N 1/00132 |
| | | | | 358/1.15 |
| 2015/0178409 A1* | 6/2015 | Kernan | ............... | G06F 16/9038 |
| | | | | 707/722 |
| 2015/0228201 A1* | 8/2015 | Nemeckay | ............... | G09B 5/00 |
| | | | | 434/85 |
| 2016/0011733 A1* | 1/2016 | Mann | .................... | G06F 3/0484 |
| | | | | 715/709 |

OTHER PUBLICATIONS

International Search Report, dated May 2, 2017 for corresponding International Application No. PCT/AU2017/050183, pp. 1-4.
Written Opinion, dated May 2, 2017 for corresponding International Application No. PCT/AU2017/050183, pp. 1-5.
First Examination Report, dated Mar. 25, 2021, for corresponding Australia Application No. 2017231090, pp. 1-5.
Response to Examination Report No. 1, submitted on Aug. 17, 2021, for corresponding Australian Patent Application No. 2017231090, pp. 1-4.
Second Examination Report, dated Aug. 27, 2021, for corresponding Australia Application No. 2017231090, pp. 1-5.
Response to Examination Report No. 2, submitted on Oct. 18, 2021, for corresponding Australian Patent Application No. 2017231090, pp. 1-9.
Notice of Acceptance, dated Oct. 28, 2021, for corresponding Australia Application No. 2017231090, pp. 1-4.

* cited by examiner

Fig. 3
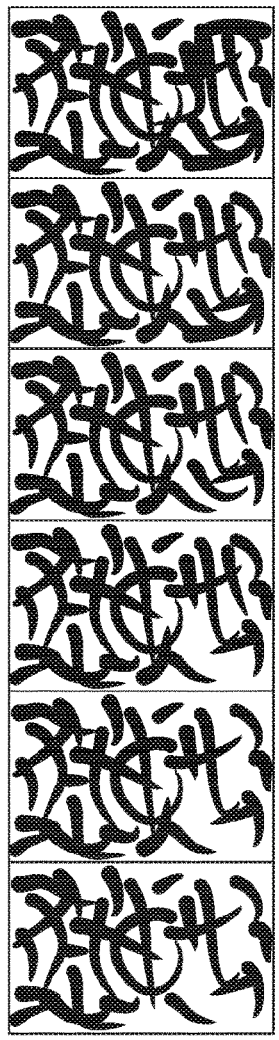
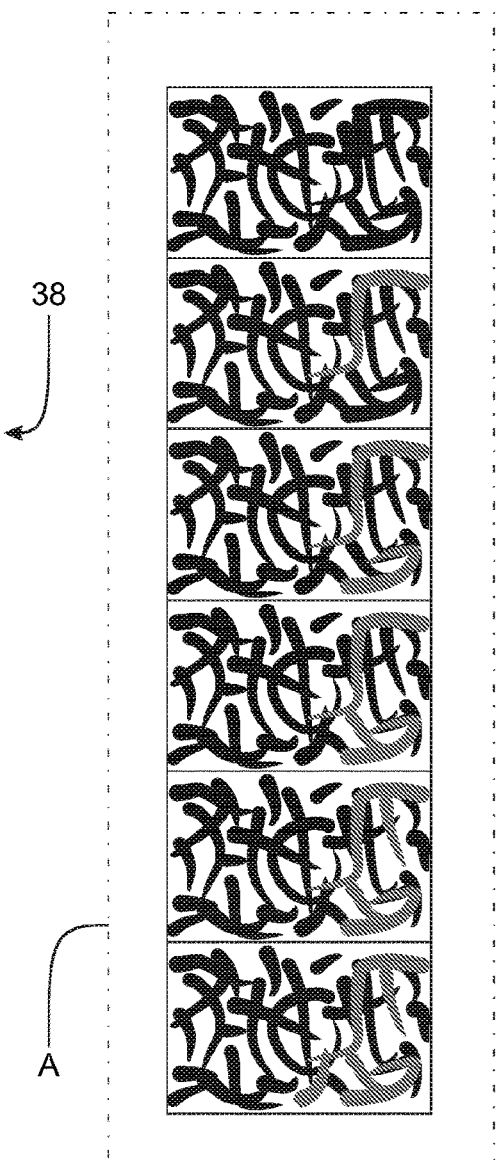
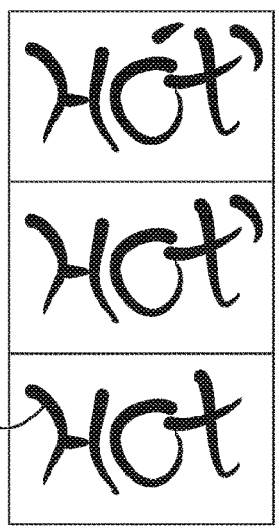
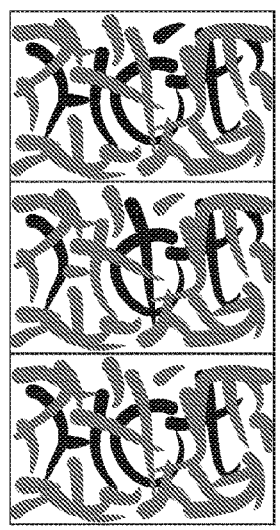

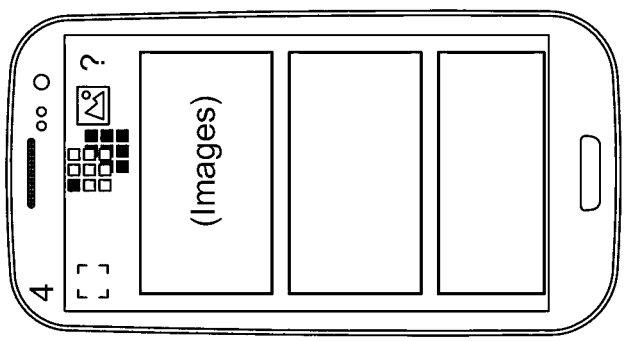
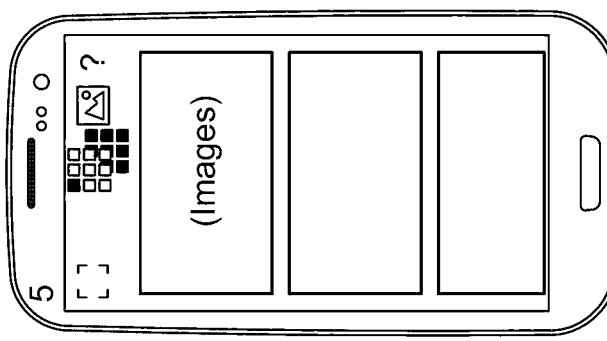
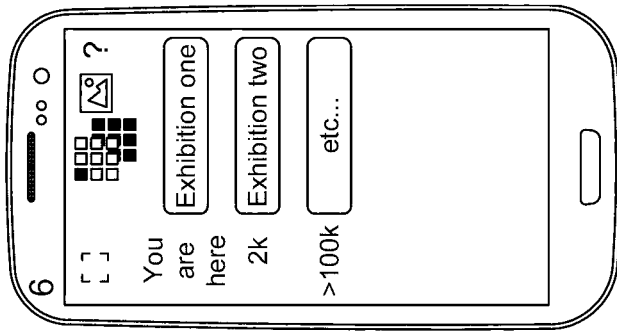
FIG. 11

App diagram sequence
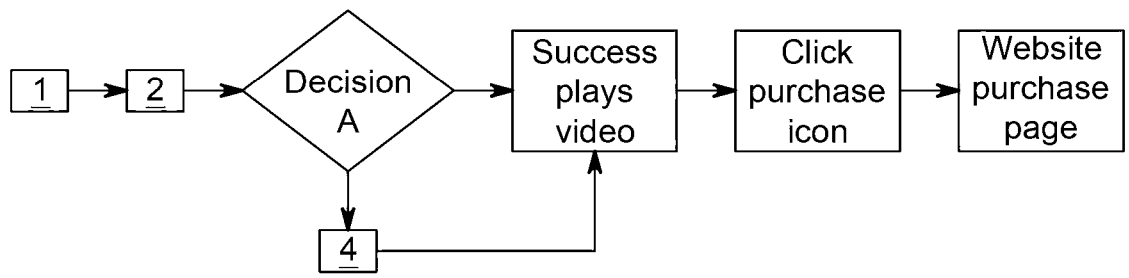
At any time if user tapps....
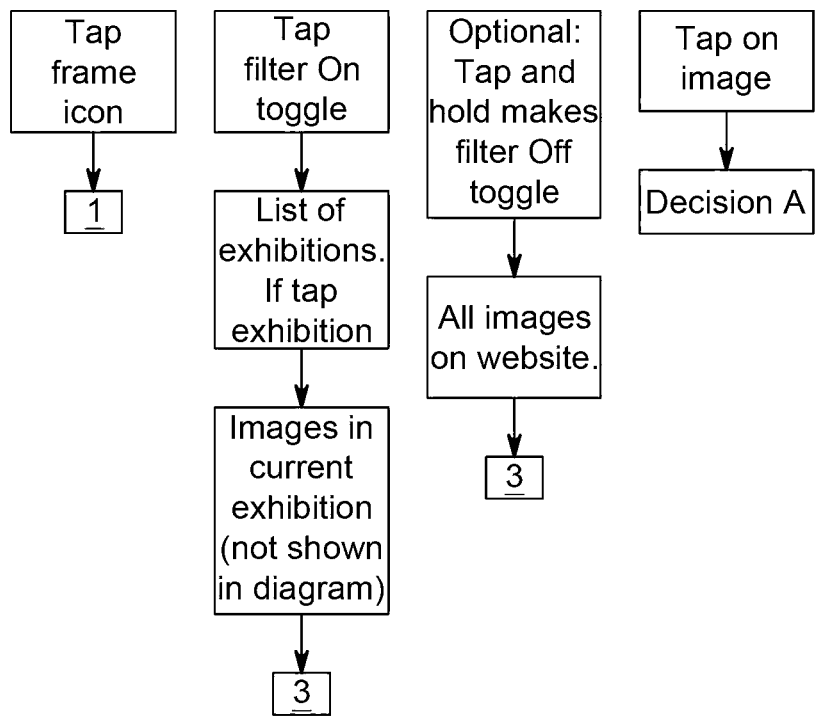
FIG. 12

ONLINE ARTWORK GALLERY SYSTEMS AND METHODS

CROSS-REFERENCE TO RELATED APPLICATIONS

This application is a U.S. National Phase application, under 35 U.S.C. § 371, of International Application no. PCT/AU2017/050183, with an international filing date of Mar. 2, 2017, and claims benefit of Australian Application no. 2016900881 filed on Mar. 9, 2016, each of which are hereby incorporated by reference for all purposes.

INCORPORATION BY REFERENCE

No incorporations of patents by reference are included in the present specification.

FIELD OF THE INVENTION

The present invention relates to online art gallery systems and methods.

BACKGROUND TO THE INVENTION

An artist is primarily concerned with the appreciation of the skill, effort, labour, attraction and renown associated with the artist's artwork in the mind of the viewer. The ability for an artist to attract people to view artworks and become engaged with the artwork is an important aspect of the artist-viewer relationship.

It is important to understand that the ability for an artist to engage with the viewer is the first and primary consideration of the artist. A secondary consideration is how the owner of the artists' work can derive further goodwill through the engagement of others with the artwork. This is generally a concern of the owner who may wish to display the artwork to the public.

The present inventor has appreciated these considerations in various contexts. It is against this background and the problems and difficulties associated therewith that the inventor has developed the present invention.

SUMMARY OF THE INVENTION

According to a first aspect of preferred embodiments herein described there is provided a computer implemented art gallery system for use by a community of users, the system comprising: a data collector for storing representations of artworks that have been created by artists; and a timeline facility configured for attempting to ensure that, upon user requests for representations of the artworks, each representation is able to be used to provide a time line reveal of a special component of the corresponding artwork; the special component of each artwork comprising a hidden or inconspicuous component of the artwork.

Preferably the timeline facility is configured to ensure that upon a user request, each representation is able to be used to provide a deconstruction of the corresponding artwork to effectively remove elements associated with the artwork to reveal the corresponding special component as part of the representation; the special component being present in the outward appearance of the representation of the artwork before said deconstruction.

Preferably the timeline facility is configured to ensure that upon a user request, each representation is able to be used to provide a deconstruction of the corresponding artwork to effectively remove elements associated with the artwork by providing a time based representation of the creation of the artwork in reverse to reveal the corresponding special component as part of the representation; the special component being present in the outward appearance of the representation of the corresponding artwork before said deconstruction.

Preferably each special component comprises a part of the corresponding artwork about which the rest of the artwork is based before the completion of artwork; the special component being present in the outward appearance of the representation of the corresponding artwork before said deconstruction.

Preferably the system includes a location facility providing at least one physical world location associated with each artwork; and an access facility for ensuring that the time line reveal associated with each special component is only provided upon a user request, when the user is considered to be associated with the at least one physical world location of the corresponding artwork.

Preferably the access facility is for ensuring that the time line reveal of each special component is only provided upon a user request, when the user is considered to be located at or near a location of the at least one physical world location of the corresponding artwork.

Preferably the timeline facility includes an automated analyser for automatically attempting to ensure that, upon user requests for representations of the artworks, each timeline reveal is able to be provided.

Preferably the automatic analyser includes a text recogniser for determining text associated with special messages.

Preferably the system includes a matching facility for matching user requests with the representations; the matching facility allowing users requests to be associated with corresponding artworks.

Preferably the timeline facility is configured to ensure that time line reveals are limited to a particular duration of time.

According to an aspect of preferred embodiments herein described there is provided a computer implemented art gallery method for use by a community of users, the method comprising: collecting representations of artworks that have been created by artists; and attempting to ensure that, upon user requests for representations of the artworks, each representation is able to be used to provide a time line reveal of a special component of the corresponding artwork, the special component comprising a hidden or inconspicuous component of the artwork.

Preferably said attempting is for ensuring that each representations can be used to provide a deconstruction of the representation to effectively remove elements associated with the artwork to reveal the corresponding special component as part of the representation; the special component being present in the outward appearance of the representation of the artwork before said deconstruction.

Preferably said attempting is for ensuring that each representation can be used to provide a deconstruction of the representation of each artwork to effectively remove elements associated with the artwork by providing a time based representation of the creation of the artwork in reverse to reveal the corresponding special component as part of the representation; the special component of each artwork being present in the outward appearance of the representation of the corresponding artwork before said deconstruction.

Preferably said attempting is for ensuring that each special component comprises a part of the corresponding artwork about which the rest of the artwork is based before completion of the artwork; the special component being present in the outward appearance of the representation of the corresponding artwork before said deconstruction.

Preferably the method includes retrieving at least one physical world location associated with each artwork; and attempting to ensure that the time line reveal associated with each special component is only provided upon a user request when the user is considered to be associated with the at least one physical world location of the corresponding artwork.

Preferably said attempting is for ensuring that the time line reveal of each special component is only provided upon a user request when the user is considered to be located at or near a location of the corresponding artwork.

Preferably said attempting to ensure includes automatically attempting to ensure that, upon user requests for representations of the artworks, each time line reveal is able to be provided.

Preferably said attempting to ensure includes using a text recogniser to determine text associated with special messages.

Preferably the method includes retrieving at least one physical world location associated with each artwork; and attempting to ensure that the time line reveal associated with each special component is only provided upon a user request when the user is considered to be associated with the at least one physical world location of the corresponding artwork.

Preferably said attempting is for ensuring that the time line reveal of each special component is only provided upon a user request when the user is considered to be located at or near a location of the corresponding artwork.

Preferably the method includes matching user requests with the representations; said matching allowing user requests to be associated with corresponding artworks.

Preferably the method includes ensuring that time line reveals are limited to a particular duration of time.

According to an aspect of preferred embodiments herein described there is provided a computer implemented art gallery method for use by a community of users comprising encouraging users to record, and upload to a computer system, time line reveals of special components of artworks; the special component of each artwork comprising a hidden or inconspicuous component of the artwork.

Preferably the method includes providing the time line reveals in response to user requests; each timeline reveal comprising a deconstruction of the corresponding artwork to effectively remove elements associated with the artwork to reveal the corresponding special component as part of the time line reveal.

According to an aspect of preferred embodiments herein described there is provided a computer implemented art gallery system for use by a community of users including a data collector for encouraging users to record and upload time line reveals of special components of artworks; the special component of each artwork comprising a hidden or inconspicuous component of the artwork.

Preferably the system includes a timeline facility for providing the time line reveals in response to user requests; each timeline reveal comprising a deconstruction of the corresponding artwork to effectively remove elements associated with the artwork to reveal the corresponding special component as part of the timeline reveal.

According to an aspect of preferred embodiments herein described there is provided a computer implemented art gallery system for use by a community of users, the system comprising: a data collector for storing representations of artworks that have been created by artists; and timeline facility configured for attempting to ensure that, upon user requests, the representations are able to be used to provide a time line reveal of a special component of each artwork, the special component of each artwork comprising a hidden or inconspicuous component of the corresponding artwork.

According to an aspect of preferred embodiments herein described there is provided a computer implemented art gallery method for use by a community of users, the method comprising: collecting representations of artworks that have been created by the artists; and attempting to ensure that, upon user requests, the representations are able to be used to provide a time line reveal of a special component of each artwork, the special component of each artwork comprising a hidden or inconspicuous component of the corresponding artwork.

According to an aspect of preferred embodiments herein described there is provided a computer implemented art gallery system, the system comprising: an upload facility for receiving representations of one or more artworks by a system user; the upload facility component for sending the representations to a timeline facility that is configured for attempting to ensure that representations uploaded by users are able to be used to provide a time line reveal of a special component of the corresponding artworks; the special component of each artwork comprising a hidden or inconspicuous component of the artwork; the system further comprising a notification facility for advising the system user of the result of the verification.

In embodiments there is provided a non-transient computer readable medium having stored thereon computer executable instructions for performing a computer implemented method as claimed in any one of the preceding method claims.

In embodiments there is provided a non-transient computer readable medium having stored thereon computer executable instructions encoding a computer implemented system as claimed in any one of the preceding system claims.

In embodiments there is provided a non-transient computer-readable medium encoded with one or more facilities configured to run an application configured to carry out a number of operations to provide any one of the preceding method or system claims Various embodiments may be limited to representations and special messages for hand painted artworks.

It is to be recognised that other aspects, preferred forms and advantages of the present invention will be apparent from the present specification including the detailed description, drawings and claims.

BRIEF DESCRIPTION OF DRAWINGS

In order to facilitate a better understanding of the present invention, several preferred embodiments will now be described with reference to the accompanying drawings, in which:

FIG. 3 provides an illustrative example of a special component feature revealed by the computer implemented art gallery system shown in FIG. 1.

FIGS. 10 to 12 provide illustrations of various smart mobile systems according to preferred embodiments of the present invention.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
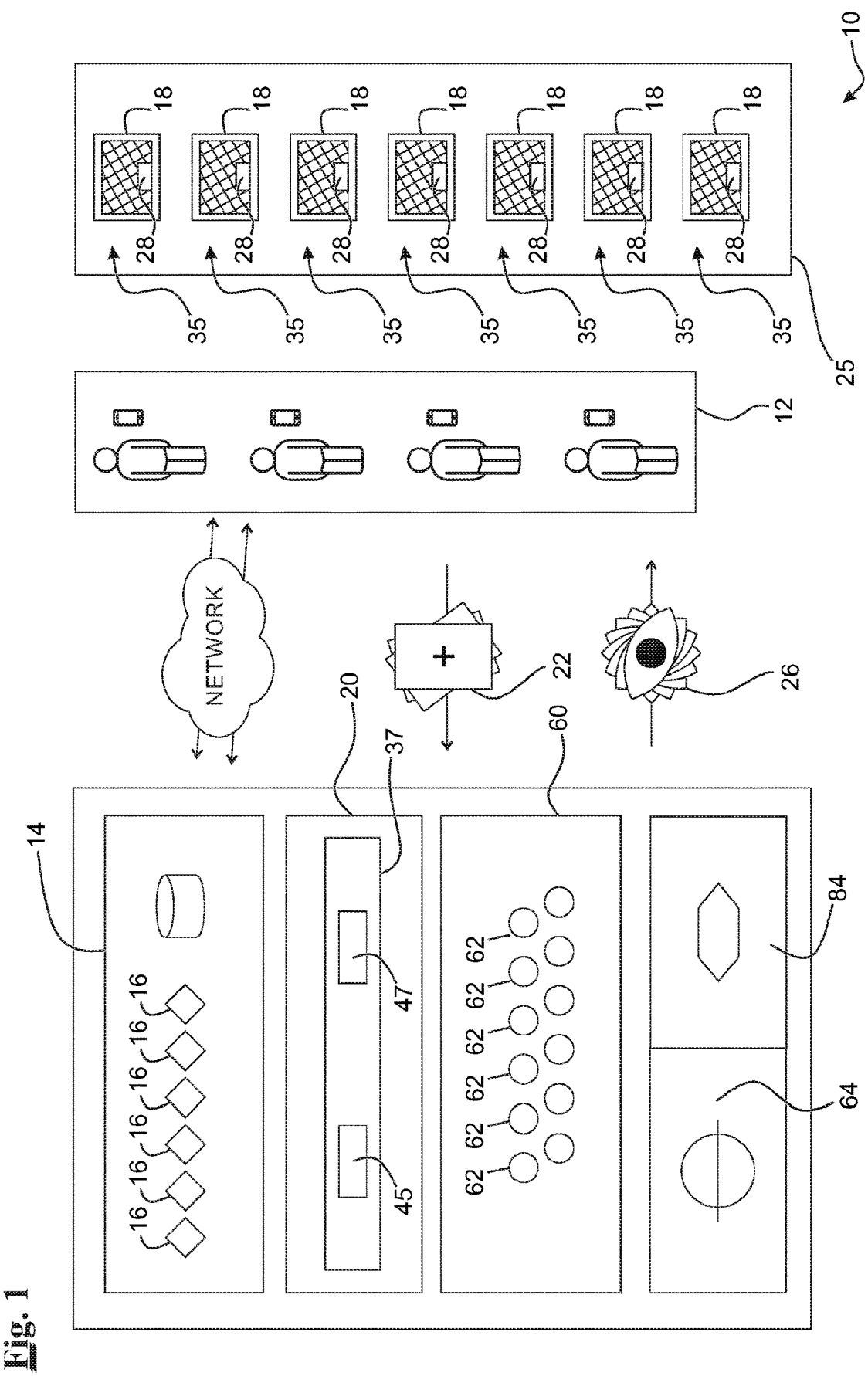
FIG. 1 provides a schematic view of a computer implemented art gallery system according to a first preferred embodiment of the present invention.

Referring to FIG. 1 there is shown a computer implemented art gallery system 10 for use by a community of users 12. The system 10 includes a data collector 14 for storing representations 16 of artworks 18 that have been created by the users 12. In this embodiment the artworks 18 comprise physical artworks crafted as physical objects (being able to be touched and felt) as opposed to electronic data. The physical artworks 18 are displayed in a physical gallery 25 (outside an online environment).

The system 10 includes a timeline facility 20 that is configured for attempting to ensure that, upon user requests 22, the representations 16 are able to be used to provide a time line reveal 26 of a special component 28 of each artwork 18. Advantageously the special component 28 of each artwork 18 comprises a hidden or inconspicuous component 28 of the corresponding artwork 18.

In this embodiment the special components 28 form tangible portions of the physical artworks 18 in the sense that they can be appreciated by the unaided human eye when the other parts of the artwork 18 are removed.

Figure 2:
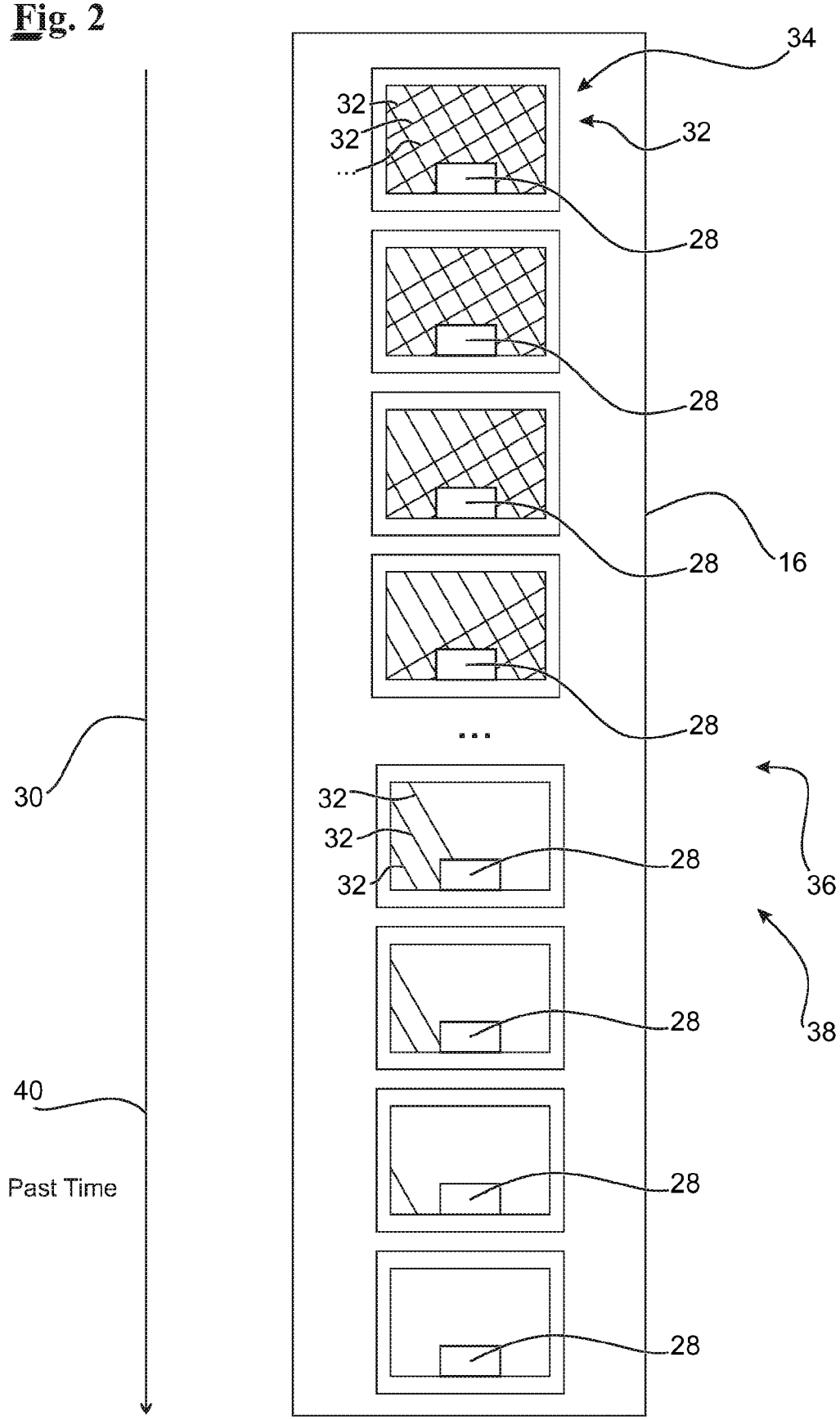
FIG. 2 provides an illustration of a timeline facility provided by the computer implemented art gallery system shown in FIG. 1.

Referring to FIG. 2, the timeline facility 20 is configured to ensure that upon a user request 22, the representations 16 are able to be used to provide a deconstruction 30 of a representation 16 of each artwork 18 to effectively remove elements 32 associated with the artwork 18 to reveal the corresponding special component 28 as part of the representation 16. The special component 28 is revealed as part of the representation 16 so as to no longer comprise a hidden or inconspicuous component 28. In this regard the special component 28 is revealed to the user who made the associated user request 22 to reveal the special component 28. By being revealed to the user (of basic intellect and insight), the user is able to identify the special component 28 as it exists in the physical artwork 18.

As such the special component 28 of each artwork 18 is present in the outward appearance 34 of the representation 16 (as presented to the user before the reveal) of the corresponding artwork 18 before said deconstruction (See FIG. 2). In this embodiment the special component 28 is also present in the outward appearance 35 of the physical artwork 18 (See FIG. 1). As such the special message is revealed by removing the other parts around the message.

In other embodiments the special messages may comprise entirely hidden messages not in the outward appearances 35. This could in an artwork 18 comprise say a layer hidden underneath the outward appearance 35. Nonetheless, in such an example, the hidden message is physically in bodily form of the artwork 18.

In the embodiment each representation 16 comprises a series of images 36 spaced to provide a video representation 38 comprising a disassembly of the corresponding artwork 18 to reveal the special message 28. The computer implemented art gallery system 10 is provided for use by a community of users 12 who are able to issue requests 22 to reveal the special message 28 associated with a physical artwork 18. Artists forming part of the community of users 12 are able to upload representations 16 for checking by the timeline facility 20. In the present embodiment each physical artwork 18 is associated with a corresponding special message 28 on a one to one basis. In other embodiments each representation may reveal more than one special message. Representations may be joined or otherwise combined to form a representation associated with an artwork.

The timeline facility 20 is configured for attempting to ensure that, upon a user request 22, the representations 16 are able to be used to provide a time line reveal 26 of a special component 28 of each artwork 18, by virtue of the following: (i) after collecting a representation 16 of an artwork 18 analysing the representation to determine whether it is likely that a special component 28 is revealed.

This is achieved by attempting to isolate a special component 28 and once isolated then determining whether the special component 28 is progressively revealed along a timeline associated with the representation. The timeline facility effectively asks is it likely that a special component 28 is being revealed in the representation 16 according to a time line. If not the representation is rejected.

In the present embodiment this is advantageously achieved using an automated analyser 37. The user of an automated analyser 37 is considered advantageous in comparison to a manual analyser or a system in which the usage must be trusted to provide deconstruction messages revealing a special messages 28.

Advantageously the automated analyser 37 includes a deconstruction analyser 45 and a text recogniser 47. The deconstruction analyser 45 attempts to determine whether a representation 16 contains a time line deconstruction. The text recogniser 47 attempts to determine whether a representation 16 contains a special message 28 as a text based textual message.

In this embodiment the timeline facility 20 is configured to look along a forward progressing deconstruction timeline in the sense of elements being taken away from the uploaded representation 16 over increasing physical time.

In other embodiments the secret message is revealed to begin and other elements are added thereto to show how the secret message was provided. The expression 'time line reveal' is to be given a broad interpretation and may be forward, reverse, or jumping.

In this manner the timeline facility 20 is configured to ensure that upon a user request 22, each representation 16 is able to be used to provide a deconstruction 30 of the corresponding artwork 18. In other words, the timeline facility 20 is configured to ensure that upon a user request 22, the representations 16 are able to be used to provide a deconstruction of a representation 16 of each artwork 18 to effectively remove elements 32 associated with the artwork 18. This is achieved before adding uploaded representations 16 to a group of approved representations 16.

In this embodiment, there is provided a time based representation 40 of the creation of the physical artwork 18 in reverse (See FIG. 2). The special component 28 of the artwork 18 is present in the outward appearance of the artwork 18 itself as well as the representation 16 of the artwork 18 before said deconstruction.

FIG. 3 provides an illustrative example of a special component 28 comprising the word 'HOT' in a video representation 38. The word 'HOT' is hidden in the first frame of the representation 16 but is progressively revealed as time increases in the video representation 38. The portion marked 'A' shows a deconstruction of the video representation 38 as the highlighted lighter elements are progressively removed. In the case of a painting FIG. 3 illustrates how brush strokes are progressively removed to effectively show the creation of the painting in reverse. This effectively reveals to the viewer how the painting was finished through to its creation from the inclusion of the special message 28.

Thus, as illustrated in FIG. 3, the special component 28 comprises a part 28 of the corresponding physical artwork 18 about which the rest of the artwork 18 is based before completion of the artwork 18. The special component 28 is present in the outward appearance of the representation 38 of the corresponding physical artwork 18 before the deconstruction.

Figure 4:
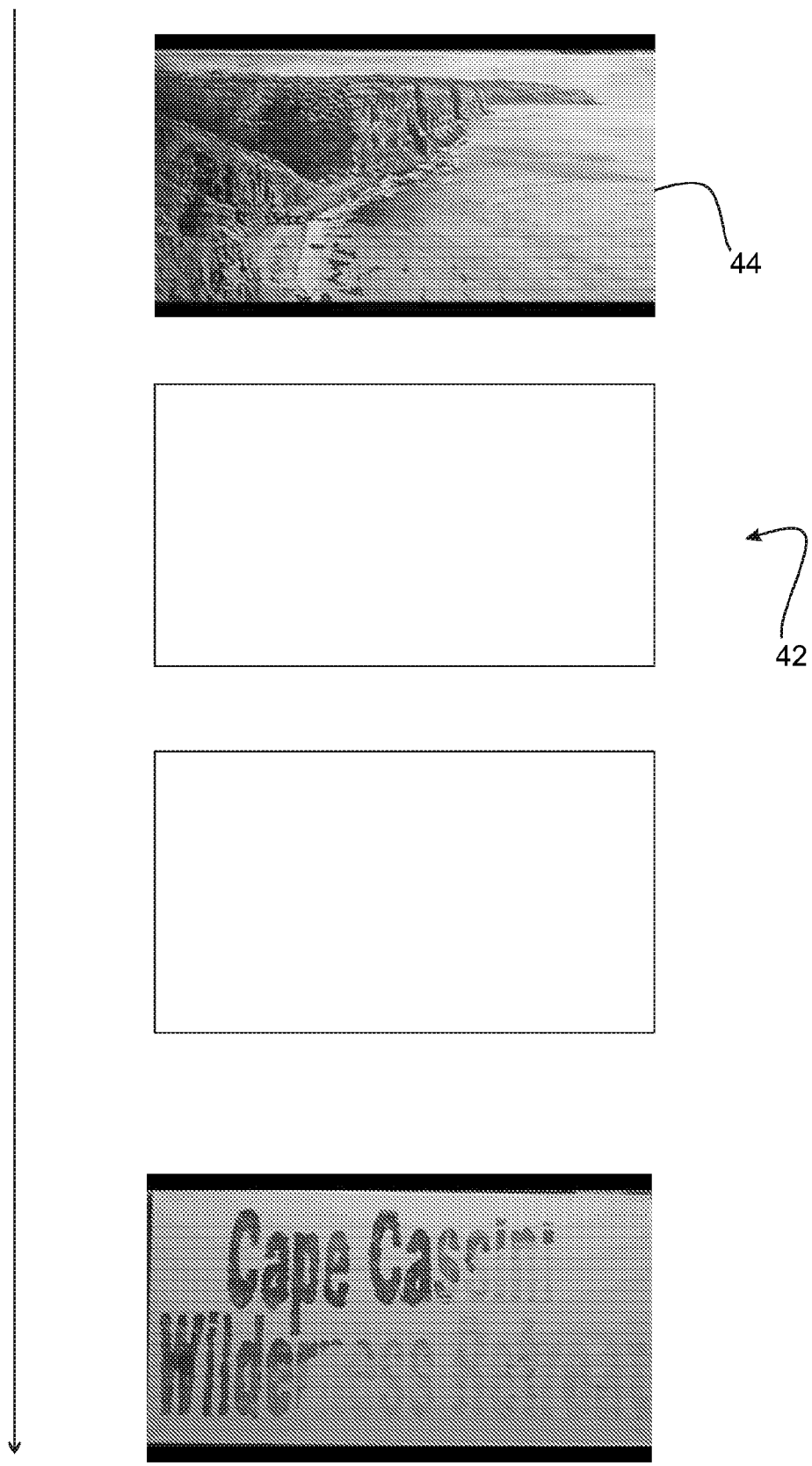
FIG. 4 illustrates a further example of a video representation delivered by the computer implemented art gallery system shown in FIG. 1.

FIG. 4 provides a further example of a video representation 42 of the creation of a physical painting 44. Whilst time lapse is used with the artist being present in front of the painting 44, the speed of display sufficiently blurs the artist out over a time lapse speed increase. Preferably the time of the deconstruction as shown to the user is limited to 60 seconds. The video representation 42 reveal a secret message of 'Cape Cassini Wilderness Retreat' as a layer and hidden message in the original artwork 44.

The timeline facility 20 is configured ensure that time line reveals 26 are limited to a particular duration of time.

The online art gallery system 10 further includes a location facility 60 that is able to provide at least one physical world location 62 associated with each physical artwork 18. The online art gallery system 10 also includes an access facility 64 for ensuring that the time line reveal 26 associated with each special component 28 is only provided upon a user request 22 when the user is considered to be associated with the at least one physical world location 62 associated with the corresponding artwork 18. In this embodiment the user must be in the proximity of the gallery 25 in which the artwork 18 is housed to be provided with access to retrieve the corresponding representation 16.

More particularly in this embodiment, for the special message 28 to be revealed the user must walk into the gallery and be present in the physical vicinity of the artwork 18 (say within 10 m or less).

The location of the artwork 18 as determined by the access facility 64 is preferably updated by an administrator such as the gallery curator. In the embodiment, the access facility 64 is provided for ensuring that the time line reveal 26 of each special component 28 is only provided upon a user request 22 when the user is consider to be located at or near a location of the at least one physical world location associated with the corresponding artwork.

In other embodiments the location of specific artworks may be verified or determine by analysing the location of user requests.

Thus there is consider to have been provided a computer implemented art gallery system 10 for use by a community of users 12, the system 10 comprising: a data collector 14 for storing representations 16 of artworks 18 that have been created by artists; and a timeline facility 20 configured for attempting to ensure that, upon user requests 22 for representations 16 of the artworks 18, each representation 16 corresponding with a respective one of the artworks 18 is able to be used to provide a time line reveal 26 of a special component 28 of the corresponding artwork 18; the special component 28 of each artwork 18 comprising a hidden or inconspicuous component of the artwork 18.

In one sense there is provided a computer implemented art gallery system 10 including a timeline facility 20 for providing the time line reveals 26 in response to user requests 22. Each timeline reveal 26 comprises a deconstruction 30 of the corresponding artwork 18 to effectively remove elements 32 associated with the artwork 18 to reveal the corresponding special component 28 as part of the timeline reveal 26.

Figure 5:
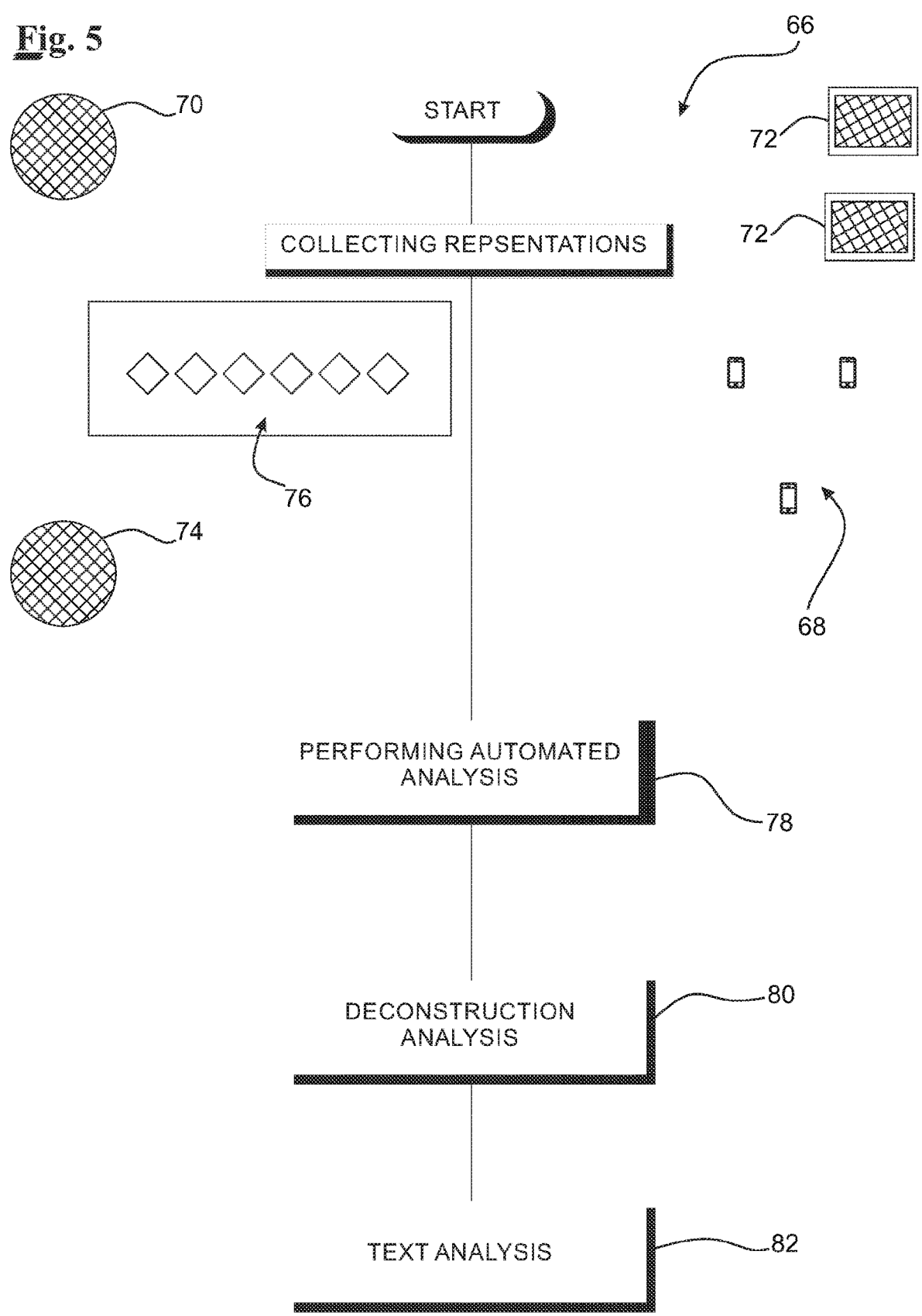
FIG. 5 provides a schematic view of a computer implemented art gallery method according to a preferred embodiment of the present invention.

Referring to FIG. 5 there is shown a computer implemented art gallery method 66 for use by a community of users 68. At block 70 the method 66 includes: collecting representations 76 of artworks 72 that have been created by the users 68. At block 74 the method includes performing a fully automated analysis that attempts to ensure that, upon a user request, the representations 76 are able to be used to provide a time line reveal 26 of a special component 28 of each artwork 18 in the a computer implemented art gallery system 10.

In the embodiment the analysis comprises an automated analysis 78 that attempts to automatically ensure that each special component 28 of each artwork 18 comprises a hidden or inconspicuous component of the corresponding artwork 18. The automated analysis 78 includes a deconstruction analysis 80 and a text analysis 82.

The deconstruction analysis 80 involves attempting to ensure that the representations 76 can be used to provide a deconstruction of a representation 76 of each artwork 18 to effectively remove elements 32 associated with the artwork 18 to reveal the corresponding special component 28 as part of the representation 16. The special component 28 of each artwork 18 is present in the outward appearance of the representation 16 of the corresponding artwork 18 before said deconstruction. The special component is also present in the outward appearance of the artwork 18.

Performing the automated analysis attempts to ensure that the representations 16 can be used to provide a deconstruction 30 of a representation 16 of each artwork 18 to effectively remove elements 32 associated with the artwork 18 by providing a time based representation 40 of the creation of the artwork 18 in reverse. This could be the creation from the presentation of the special message 28 or the entire creation of the artwork 18. The special component 28 of each artwork 18 is present in the outward appearance of the representation 16 of the corresponding artwork 18 and in the artwork 18 itself.

Performing the automated analysis attempts to ensure that each special component 28 comprises a part of the corresponding artwork 18 about which the rest of the artwork 18 is based before completion of the artwork 18. This is illustrated in FIG. 4. The special component 28 is present in the outward appearance of the representation 16 of the corresponding artwork 18 and in the artwork 18 itself.

Figure 6:
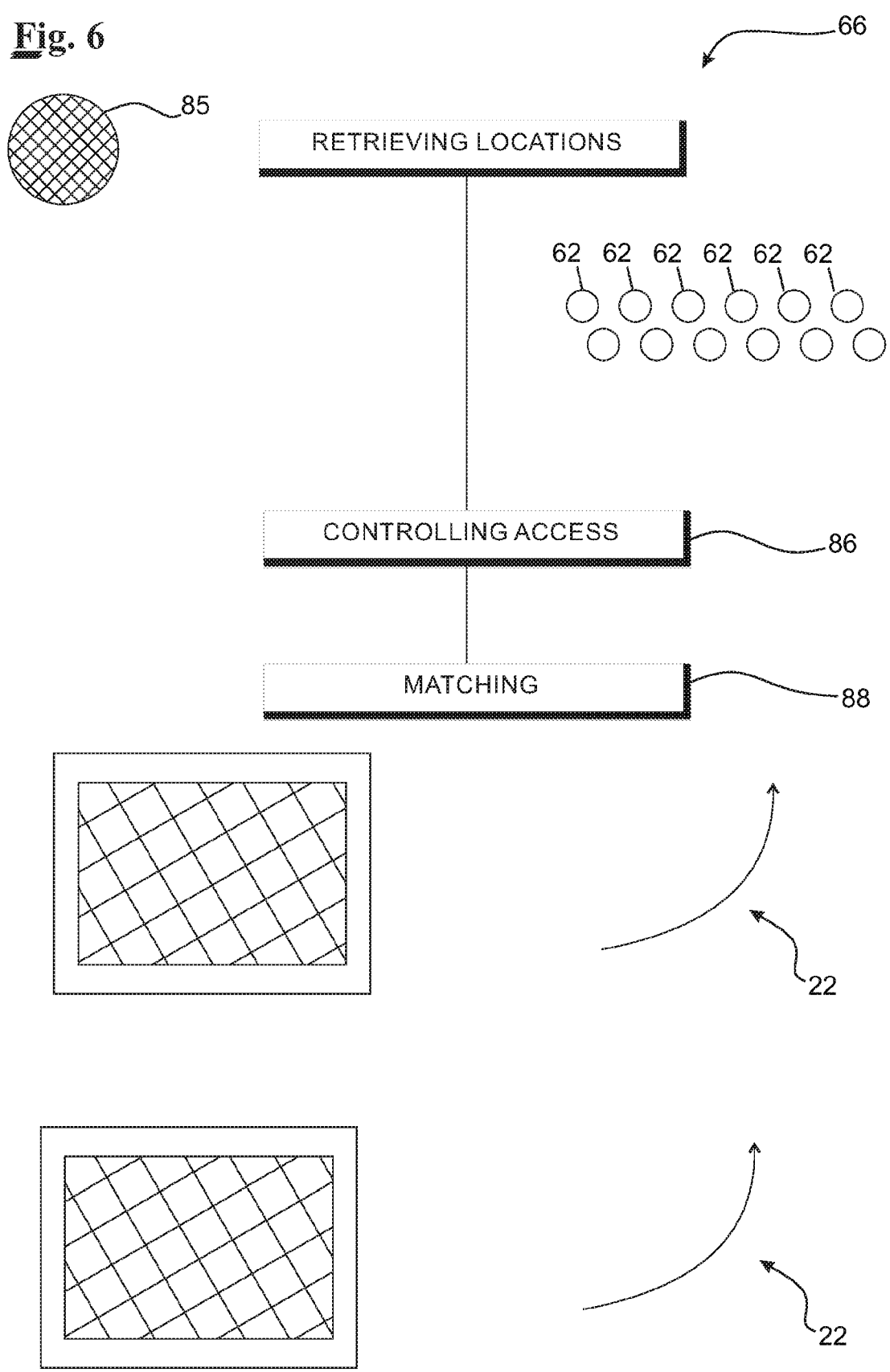
FIG. 6 provides a further schematic view of the computer implemented art gallery method shown in FIG. 5.

Referring to FIG. 6 at block 85, the method 66 includes retrieving at least one physical world location 62 associated with each artwork 18. The method 66 includes controlling user access 86 to attempt to ensure that the time line reveal 26 associated with each special component 18 is only provided upon a user request 22 when the user is considered to be associated with the at least one physical world location 62 that is associated with the corresponding artwork 18. Preferably this comprises ensuring that the time line reveal 26 of each special component 28 is only provided upon a user request 22 when the user is consider to be located at or near a location of the at least one physical world location.

The requests 22 comprise QR code requests together with GPS data sent by a mobile application in response to a user. Alternatively, the requests 22 comprise artwork photograph/image requests 22 that are analysed by a matching facility 84 that matches the image requests 22 with the representations 18. Various image matching algorithms may be employed.

In this connection the method 66 includes matching 88 user requests with the representations. The matching allows user requests to be associated with corresponding artworks. The method 66 also ensures that time line reveals are limited to a particular duration of time. In some embodiments, the matching is made against a still image of the artwork, separate to the associated representation.

Various examples of matching are known and discussed herein.

Thus there is considered to have been provided a computer implemented art gallery method 66 for use by a community of users 68, the method 66 comprising: collecting representations 76 of artworks 72 that have been created by artists; and attempting to ensure that, upon user requests 22 for the representations 76 of the artworks 72, each representation 76 is able to be used to provide a time line reveal 26 of a special component 28 of the corresponding artwork 72, the special component 28 comprising a hidden or inconspicuous component of the artwork. In the present embodiment the special message comprises a hidden textual message.

In one sense there is provide a computer implemented art gallery method 66 for use by a community of users 68 where the method 66 comprises encouraging users 68 to record, and upload to a computer system 10, time line reveals of special components of artworks 72 where the special component of each artwork 72 comprises a hidden or inconspicuous component of the artwork.

Traditional artworks, such as chiefly hand painted art, are displayed on a wall. In comparison the embodiments of the present invention described provide an easy way to connect a video recording of the artwork being constructed, to the physical artwork, in such a way that the video is easily accessible to a user in the proximity of the physical artwork.

A first part of several embodiments is to record the creation of an artwork to video. A second part of the embodiments is to host the artwork and video in a database on a computer network (The Internet). A third part of the embodiments is to use matching software to allow the correct video to be easily retrieved from the Internet by a user and be viewed on the user's smartphone. This enables the routine use of a smartphone to watch an artwork being created, whilst a viewer is in the proximity of the final physical artwork. This may be the case, for example, in a physical exhibition or gallery in the real world.

A fourth part of various embodiments is to facilitate a community of artists to employ these facilities in their art and provide an online interactive system.

For the first part, the recording of the video would, in several envisaged embodiments, to at least be video recording relating to the artwork in some way, such as the artist briefly talking to a camera about the artwork. This is most likely to be a time-lapse video of the artwork being created, the total video being of shortened time duration so as to be easily downloadable to a digital device.

It may be that artists are not technologically experienced enough to generate such recording. It is however envisaged that online systems such as WEVIDEO.com can be utilized to allow the user to cut and speed up such videos. Primarily the user would cut both the beginning and end of the video to remove unnecessary recording and then choose a speed. It is possible using encoding systems such as ZENCONDER.com to automatically speed up the video for later display. The APIs of such systems are preferably made use of by the online system of various embodiments.

Further to the second part, it the database of imagery, video or information is accessible using the online system by the artist or copyright holder on an ongoing basis, and therefore may be altered by them, from time to time.

For the third part, several embodiments at least make use of image matching software such as a QR reader and make use of a QR code mounted in, on or near the physical location of the artwork. The QR code holds the online location of the correct video.

The online location may be referenced in the database. The online location may comprise and internet URL (uniform resource location). The URL may automatically launch the video on the user's smartphone. Further to this, various embodiments may include customised image matching software such as an 'App' (say 'The mobile application') which may be made available to the public (users) on the server to download to their smartphone. When a user launches the mobile application, and points their smartphone camera at the final artwork, the mobile application will launch the correct video on the user's smartphone.

Notably near field communication systems or image matching may also be used for providing a locator for ready online access. Various augmented reality systems are able to superimpose a 3D representation onto the video camera display of a smart phone where the video display shows a representation of the real 3D world.

Preferably the system includes an augmented reality facility whereby the representations showing a special message is superimposed over the actual physical artwork in the gallery when being viewed in real time through the user's smart electronic device. In one embodiment VR experience headwear is provided.

Further to the third part, the video may include other imagery as deemed appropriate by the artist to convey the special/artistic message, or alternatively, in the case of corporate commissions, as deemed appropriate by a corporation to promote their business message.

Alternatively, for the third part, instead of a video, a website with information may be launched. This may include information about the artwork which adds to the artwork, information about the artist, and provide access to the videos, or information to promote a business message. This is preferably achieved by prompting the user as to whether the user would like to view the special or alternatively further information such as that detailed above.

As discussed the various embodiments are made available from an online system, with all necessary facilities and instructions, including the database, software and hosting of the artwork and video, and log in facilities, such that the community of artists is encouraged to employ the facilities to produce the art.

The creation process of artworks, within the various computer implemented systems, can be made part of the artistic message, because the streamlined processes and facilities result in the video becoming easily accessible when a user is in proximity of the artwork.

This is preferably done with a smart mobile device using which GPS is used to assist in artwork identification. IF GPS location of an exhibition, or an individual artwork is recorded in the database, then the Computer system (Fixed/Mobile) can compare this to the GPS location of the mobile device and restrict or provide access.

The GPS location in database may be updated by the mobile application, which is used to view an artwork or a print. In some embodiments multiple GPS locations may become associated with one artwork. Copies of various artworks may be displayed at various physical galleries or museums.

In one advantageous aspect, the system is configured to 'learn' where artworks are depending upon the GPS locations of images (videos or image) are coming from.

When hanging artworks a curator may use the mobile Application to scan an artwork and create an associated GPS entry in the database.

Possibly the same data may be shown for each different GPS location, or different data may be shown, or the user may choose to see various selections of data.

In one particular embodiment GPS is used to exclude viewing access apart from in a gallery housing the artwork. GPS may also be used to refine/confirm which artworks are shortlisted by the access facility, so as to comprise method of inclusion rather than exclusion. For example an algorithm may be provided which includes various data with various weights, data may include quality of image captured by user, the degree of match with representations, and then the degree of match with GPS records. If the GPS record does not match, but the others are a good match then outcome is still a success. Conversely if image captured is of poor quality, and there is low level of a match with representation 16, but GPS record has a match then also a success.

In one arrangement, a user has a choice of enhancements from multiple artists. For example when viewing an artwork (such as the Mona Lisa) various digital enhancements for selected artists may be superimposed thereon. The user can view the data whilst scanning the original, or a print, with possibly different enhancements available at different locations.

In various embodiment, 'In-app' sales may be presented to the user (including the artwork itself). This would solve a current problem at exhibitions, where a visitor has to locate the curator and organise the purchase of an artwork. The curator could monitor the website which would alert them to any view or sales. In the case of a sale, they could then manually place the dot on the artwork. The system preferably enables artworks to be purchased anonymously inside the exhibition. If the artwork is sold it may be removed as an available artwork.

In other embodiments, the time-reveals may be purchased through the mobile application.

In one system or method, background processes match artworks to digital content, so the user as they browse inside the exhibition, the artworks will come alive by themselves to reveal the special message.

In one embodiment the process for creating a hidden message artwork and upload. Is as follows—at a first stage, using a computer a photograph of the final image to be painted is placed inside the words comprising the special message. This can be done using Photoshop, Corel Paint, Gimp or another image creation/manipulator.

At a second stage, using an image projector, the words are projected onto the canvas. The outline of the letters is lightly traced onto the surface of the canvas. Preferably the tracing is light so as not to be easily visible from say further than 1 m from the canvas.

At a third stage, a video camera is set up to record the artist's actions at the rate of 1 frame over 30 seconds, or other suitable rate.

At a fourth stage: using the image from stage one, and the outlines on the canvas from stage two, the artists paints the relevant colours inside the outlines, fixing the special message in the outward form of the painting.

At a fifth stage: Once the words are fully painted a high definition image of the canvas is captured with a still camera.

At a sixth stage: while the paint is still wet (assuming the use of oils), but otherwise when the paint is dry, the full final image is painted around and over the words painted at stage 4.

At a seventh stage: once the artwork is completed a high definition image of the final canvas is captured with a still camera.

At an eight stage: using a computer and video manipulation software, the footage is combined in a pleasing manner, so that the time lapse reveal has a maximum artistic effect.

At a ninth stage: The artist logs into the website and clicks the upload new artwork link. The artist is taken through the steps to name the artwork, add a text description, and upload the high definition still from stage 7. All are recorded in the computer data base on the internet.

At a tenth stage: the artist creates the videos in all a formats for upload to the server. The server encodes the videos to be viewable on various mobile devices.

At an eleventh stage: the server provides a QR code for printing by the user—as labels for the artwork which is displayed with the artwork.

At a twelfth stage: a user can access the video in the following possible ways: a) visiting the website using a computer and clicking "video" link beside the image of the artwork; b) pointing the camera of their phone at the QR code on a mug, or the QR code on the label under the artwork, or other item so printed, c) or pointing the to-be-developed App at the original artwork or a large print of it.

Future envisaged processes include an online tool to cut shape, will cut free drawn shape, text, allows user to download cut image, or puts grid pattern over cut image to allow tracing and view from screen. In the system as user options once and new artwork is added, there is an extra option to upload video. Video is processed online into appropriate files and file types, and stored in a meaningful database structure. Entry in a database may include Artwork ID, final image name location, video name location and GPS location.

In various embodiments artists are able to be creative during the process of making art by deliberately including messages, or layering's of art which may be partially or fully obscured in the final work, which may include words, numbers, shapes or even whole paintings, overpainted in any number of layers, with the messages or layering's only revealed in the video. This allows artists to add special messages to an artwork.

Consequently, various embodiments allows the artistic potential of hidden messages and layers in an artwork to be developed by the artistic community. Each of these provide a special message to the viewer.

In the case of the various mobile applications, the video, in embodiments is displayed when a smart phone camera with a launched mobile application is pointed at any printed image of the artwork, such as may be placed on a wall, glassware or apparel. This allows further development as an artistic device. For example, the hidden imagery may be a painting of internal organs, where the final artwork is a human torso. When the final artwork is reproduced on a tee shirt, a smartphone will reveal the hidden painting of internal organs.

Alternatively to the above, in the case of using a QR code, the correct QR code may be printed with, in or near the image, and will achieve the same effect. Use of a QR code 'in' an image is further discussed in 'alternatives'.

The embodiments described are considered to allow the commercial potential of hidden messages to be developed, because promotional messages can reside within an artwork, such that a company name, product or mission, or other such artistic effect as is desired, is revealed on a user's smartphone.

The company may display the original artwork in their waiting room, as is traditionally done. An image of the artwork may be printed on a mug or other promotional item, which is sold or given as a corporate gift. The video may include such other imagery promoting the corporation as is desired. In the case of a resort it may include images of the rooms for example. The video may further include tracking information, such as booking incentive, where by penetration of the video can be assessed from the number of responders, as a marketing tool. This may even be included by the artist in the painting, The user will see on their smartphone these hidden messages, which may include artistic effects, and other corporate imagery. With the promotional items sold or dispersed by the company as corporate gifts, users can reveal the innovative video to friends, thus spreading the corporate message.

Alternatively, the commercial potential may be developed such that the corporation may sponsor an artist, with the artwork being entered into for example, an art competition, and the hidden message is then revealed to a user showing the sponsor name along with whatever artistic effect, inside the artwork.

At a local level embodiments may directly facilitate artists local to an area to sell artwork to local companies and people. An artist can approach local companies offering to paint a commission with this novel inclusion. In that way local companies can support their local artists and visa-versa. Artists can broaden their market to new segments. At a personal level artists may include birthday greetings for example into to artworks for friends and family.

Embodiments provide a database of artworks and video locations, and its purpose is to ensure the video will always be available at the location specified in the database when someone points their phone at the artwork. Various embodiment improves on using a QR code to access the video by having a dedicated mobile application which users download, and the user can simply point their phone at the picture, rather than at an associated QR code.

With QR codes there are a multitude of QR code readers all of which offer different experiences. In various embodiments, by having a dedicated app for the purpose of image matching, users will always have a predictable experience. With QR codes there is the potential for malicious use of QR codes, for example if a malicious code is adhered to a wall near a painting, or over the intended QR code, a user may scan it thinking it's for the artwork, but instead download malicious code to their system. With the use of a dedicated mobile application there is no risk of a user being misdirected to a malicious site.

In the case where an embodiment relies on a QR code rather than the a dedicated mobile application, the system hosts the database, which connects artwork and videos, so controls changes in location, so any changes can be taken into account and be updated on the database, and redirection or other mechanisms can be used so a legacy QR code will always ultimately direct a user to the correct video.

Where a QR code is displayed, users realise more information is available. In the case of the mobile application, without a QR code on display, a way of informing users that the video exists needs to be provided, and this may be done by use of a mark or logo on or near the artwork so as to inform the user that the mobile application software exists and video exists. It may be that both QR code and the mobile application are used, so as to employ the advantages of each.

Image Matching: Google has image matching software in its google images website as do other search engines, and there are reverse image apps that find similar images on the web based on the image you point your phone.

There are various papers on image matching such as those provided by the MIT CSAIL Computer Vision Research Group. For example there is a paper by Tom Yeh, Konrad Tollmar, Trevor Darrell (MIT CSAIL Cambridge, Mass. 02319) entitled 'Searching the Web with Mobile Images for Location Recognition' that describes a process of matching the image of a location, (i.e. photo of a building) with GPS data. The process described by MIT may find multiple pages that the user can then browse, rather than finding the exact video/website that is associated with a particular image. The various embodiments of the present invention are artwork specific, with a specific video of that artwork being produced.

The various embodiments of the present invention record the construction of an artwork to video. An artist may video record their art for the general interest of an observer to see the painting being done, or, because the embodiments allow for the prospect of hidden messages and layers, an artist may use it as an artistic device.

When a user is standing before an artwork, the artist can use various embodiments to reveal to the user one or more hidden messages. This facility may enhance an artwork in a multitude of unpredictable ways, and is only limited by the imagination of the artist. Artists will be excited by the prospect of using the system as an artistic device with their traditional artwork.

Notably using hidden messages in a traditional hand painted artwork is different from placing hidden messages in a digital artwork because of the scarcity value proposition. There can only ever be one instance of an original hand painted artwork, thus the item can become extremely valuable. A system solely for original hand painted artworks is preferred.

Art Galleries: At an art gallery, currently users find information about an artwork probably on a printed card mounted near the artwork, or listen to a pre-recorded description 'tour' of artworks on a listening device, or conceivably access further information on an artwork via a QR code mounted near the artwork. All of these mechanisms attempt to give the user more information on an artwork. In addition to the special message aspects, various embodiments of the present invention improve on this, in the case of the alternative use of connecting to information about an artwork, and where the mobile application is employed, by: a) allowing for an 'on demand' system for users to access further information about an artwork which does not rely on QR codes; b) being a single authoritative source of information about an artwork as per the wishes of the artist or copyright holder, and because of this, and further to it, can link to other sites, videos and information which are then also part of the artwork, and thus allow artists to employ a multitude of artistic devices in the work; and c) in conjunction with the use of GPS technology, providing the location of, and distance to, other artworks or exhibitions which may use the system, in the surrounding area.

Whilst normally an artists retains copyright on artworks sold, currently an artist can lose control of the information associated with their artwork after it changes hands. In the case of my system referencing either video or information on an artwork, it allows an artist to control what extra information a user is directed to when viewing an artwork, after the artwork has been sold. For example any organisation can create a QR code to a website with information about an artwork and mount it near the artwork, but in the case of the mobile application, or a QR code contained within an artwork (see Alternatives), various embodiments works from the artwork itself, and so only the data created in the original database recorded by the artist will be referenced. In the case of accessing information, that data potentially may become the default primary authoritative source of information about that artwork.

Where access rights to the data are provided, where copyright transfers to a buyer access rights will also transfer, so a password and login system as described in the alternatives section may be used to allow copyright owners to change and allow continued access to the data.

Various embodiments improve some elements of corporate promotion. Companies wishing to promote their business currently can put links to their information on promotional items such as mugs using QR codes. Embodiments allows them to use artistic images to create links to their information. Also embodiments allows companies to display their name inside an artwork, and for it to be easily accessible via the mobile application, adding an element of interest.

Companies can use this facility to add further dimensions to their message by associating their name with a notable artist or a notable artwork. For example, a company may sponsor an artist to enter a major art competition, such sponsorship being hidden within the artwork, perhaps only revealed after winning the event. Or a company may wish to associate their name with a particular landscape or person, where that association is only revealed upon viewing the video.

In various embodiments, the mobile application may evolve into an art video viewing device, where a user can select artworks on their device to view the videos, removing the need to be in front of the artwork.

It may be that when an artist is adding an artwork to the database, if the artwork is too similar to existing artworks in the database, then the artist may be alerted to the similarity and so may alter the artwork in some way to make it more distinctive and to differentiate it from another artwork in the database before proceeding with the upload.

The mobile application may further allow user to superimpose artwork with a video in a similar way to what happens on augmented reality business cards.

The artwork may be a digital artwork, with the process of creation digitally recorded on a pc as a video. The final artwork and video would be uploaded to the website in the same way. The final artwork when printed, and a smartphone with image matching software would take the user to the video in the same way.

Various embodiments may include an authorizing system to enable only the copyright owner to access and potentially alter the artwork information and or video. This authorising system may be done with the inclusion of identifying data on the uploader, who is assumed to be the initial copyright holder, such as email address. In the circumstance where copyright changes hands, the access rights to the data can be transferred by the old copyright holder to a new copyright older, so from one email address holder to another.

To identify the artwork to which copyright is authorized, a unique id and code may be issued by the website to identify each artwork, with such id and code fixed to the rear of an artwork, either by writing or attaching a label, such that only a person with full access to the artwork, and thus able to examine the rear, can find the id and code. It may be that email address for an individual who is authorised as the copyright holder, combined with the artworks id and code form the basis for identifying a legitimate change in copyright holder for a specific artwork. For example, the new copyright holder must supply the correct email address, correct artwork id, and artwork code in order to access the data for that artwork.

Further to the above, similar regulated access to change the video may be available for corporate commissions, so that the video linked to the artwork can be updated, or altered over time, by the company. It may be this ability to alter the data can be further used as an artistic device, as noted below. Alternatively, the access to these facilities may be restricted to the artist whilst they own the painting, but locked down and never able to be changed once a painting is sold. Such choices would depend on the business model adopted.

The image uploaded may be an image of the start of the painting, for example consisting of a few distinctive lines or shapes perhaps, which is then printed as art, or on apparel or mugs. Every week the artist may add to the artwork in some way, video record the addition, and upload the video. When a user points their phone at the earlier printed art on apparel or mugs, they will see its further development in the video.

Producing a painting can take day or weeks, so video footage is best recorded in time lapse, and may require specialist equipment. Consequently to broaden the use of embodiments, video of the artist painting a small portion, or a brief clip of the hidden message followed by a brief clip of the final work, or a video of the artist just describing the painting to camera, may form 'the video' (time reveal). There is nothing herein however that would restrict the recording of the whole artwork production process to video, and the video consisting of days or weeks of footage. In this circumstance 'the video' would consist of multiple videos.

The artworks and videos may be available to view on the website in a simple browse and click interface, which may include the ability to search artworks by subject and artist. Thus the artworks and videos will be available to any internet user.

In the case where the QR code is mounted 'in' the artwork, this may be achieved with a software tool, and done by the artist at the website, at the time of uploading the digital image of the artwork. The artist may be able to control the location of the QR code so as to enhance, or at least not to detract from, the artwork, and the QR code becoming part of the digital image, at the correct scale. Alternatively, it may be the QR code can be digitally placed beside the image, and dynamically scaled so to be the correct size when the artwork is reproduced for printing on a mug verses apparel for example. When a QR code is merged with the artwork in this way, prints of the artwork on glassware and apparel will automatically include the correct QR code, at the right size. The presence of the QR code on these items would serve to inform the user that further information is available.

In this above circumstance the original artwork would not carry the QR code, only the prints and digital images would carry it, in which case it may be that the QR code is also made available for the artist in a form whereby they can print and affix it to the front of the original physical artwork, and that may be placed in the same location as was done digitally, at the same scale, at the time of uploading the image of the artwork and the video. Further, it may be such a QR code is customised to include the artist's name, or other relevant information, so that the artist can print the QR code and affix it to the original artwork where they would normally sign their name, for example. There are various known processes which can be employed to permanently fix printed paper onto acrylic and oil canvas in such a way that it forms part of the artwork. In this case the printed QR code has the advantageous possibility of conveying the artists name (which is often difficult to decipher from the signature), as well as the link to the video or further information.

The image matching software may be adjusted so it activates a video or information when shown a specific portion of a painting.

In terms of a process: (i) user downloads The mobile application; (ii) camera activated; (iii) user points camera at artwork; (iv) when image inside rectangle user clicks capture software takes captured image and attempts to match it with digitised image on database; (iii) software includes upper and lower match thresholds; (iv) if match above upper threshold then exact match found; (v) if match below lower threshold then no match found; (vi) if match between lower and upper threshold then partial match found; (vii) if exact match found then web address of data retrieved and passed to web page viewer; (viii) if partial match found, top n, say 5, partial match images retrieved; (ix) viewer presented with images of partial matches, each match is hyperlinked to its relevant data; (x) view touches correct image and is taken to data.

Alternatively if multiple partial matches retrieved, the user may be prompted to select the artist name then to be presented with correct image and video. Alternatively user may be prompted to take a second photo of the signature, which is then processed by the software to find the correct match from the partial alternatives. If no match is found, or if in the opinion of the user none of the partial images match the artwork, then user has the further option to retake image, or use a QR code, or cancel.

Presuming a successful match, the user is taken to the web page which will normally play the video. At the end of the video the user may be given options to: reactivate camera, replay video, browse other videos.

Various representations that have been stored may include a series of digital images, videos or animations or 3D representations. Other representations are also possible. More than one representation may be associated with a particular artwork. The users of various systems would include those users viewing the physical artworks and the representations as well as the content uploaders who upload the representations. The artworks may be displayed at any suitable location, even say a painting hanging on someone's wall at home.

In various embodiments timeline facilities provide a verification mechanism. If there is a reveal of some special component—it is approved. The timeline facility approves representations and when they are played the reveal occurs. The representations can constitute a multitude of digital representations. In various embodiments, a timeline facility identifies that there is a reveal of some special component and either approves the representation or classifies the representation as rejected. The representations may include digital enhancements, 3D effects, a video of the artist talking to camera.

Figure 7:
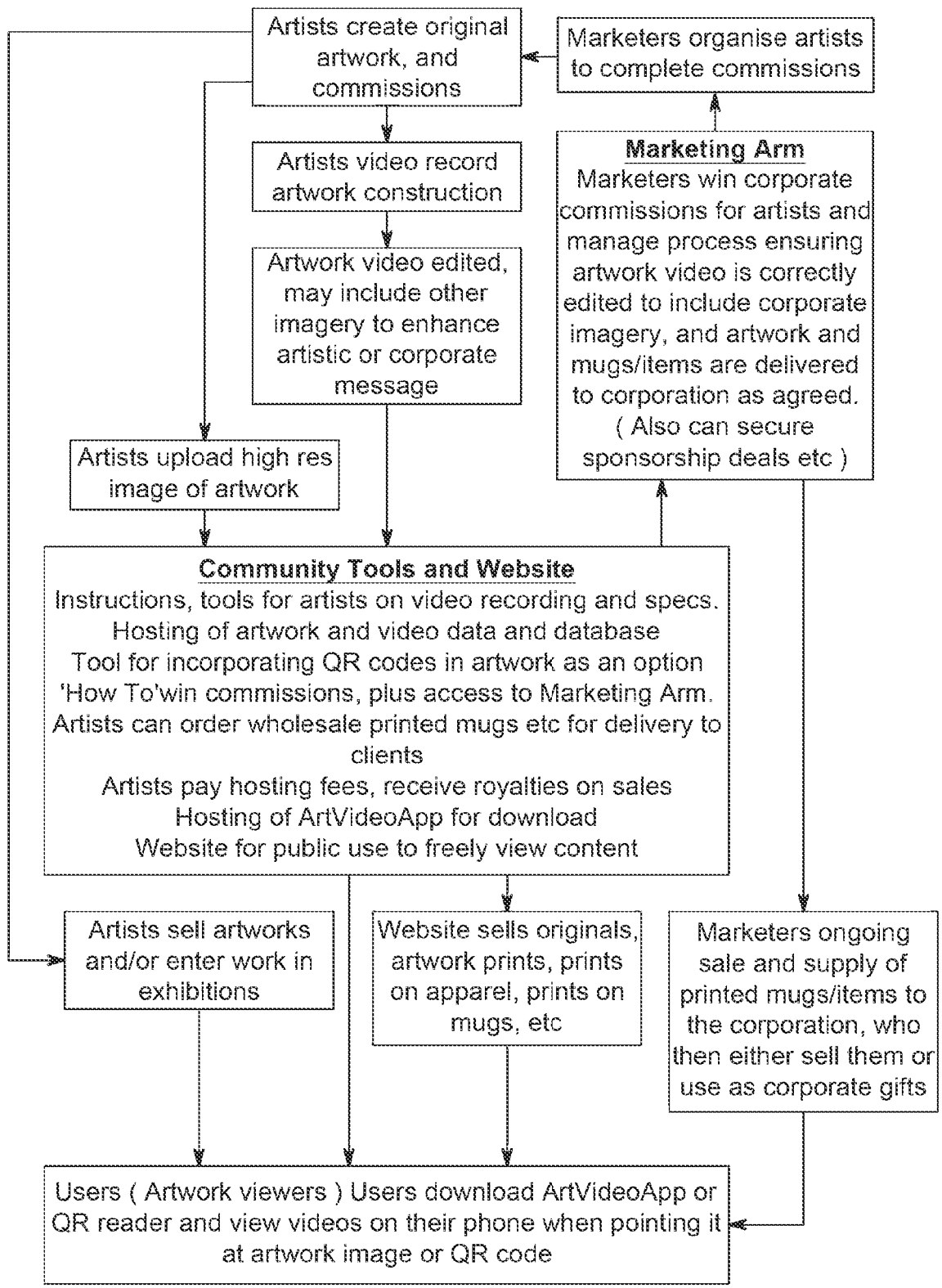
FIG. 7 illustrates a method of operation according to an embodiment of the present invention.
Figure 8:
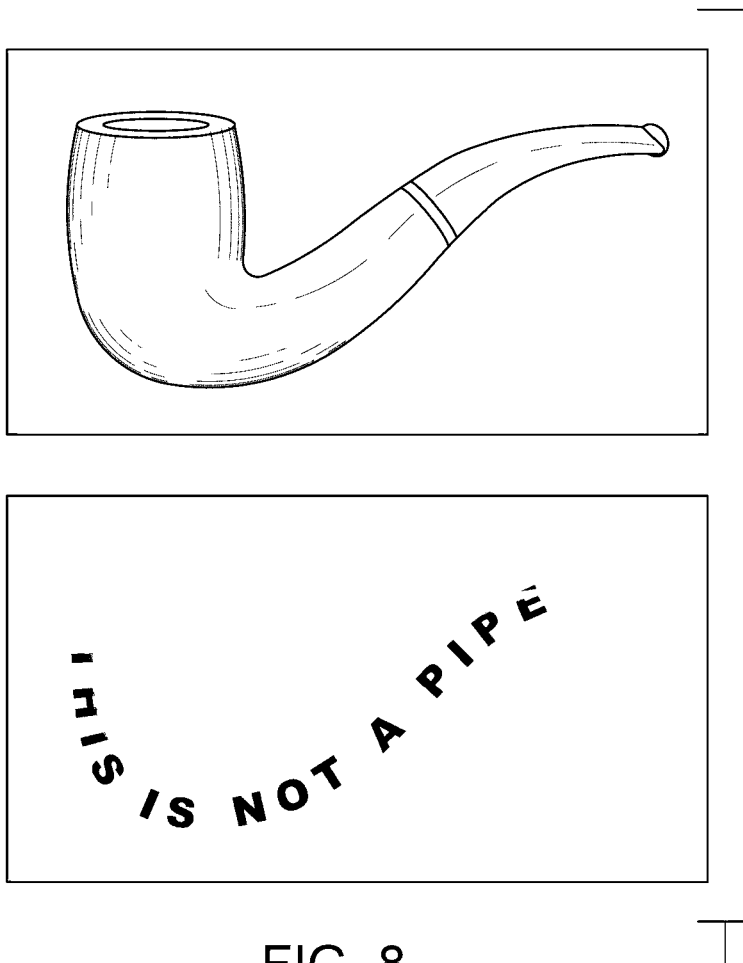
FIG. 8 provides an example of a special message.

FIG. 7 shows a method of operation according to various embodiments. FIG. 8 illustrates a special message.

Figure 9:
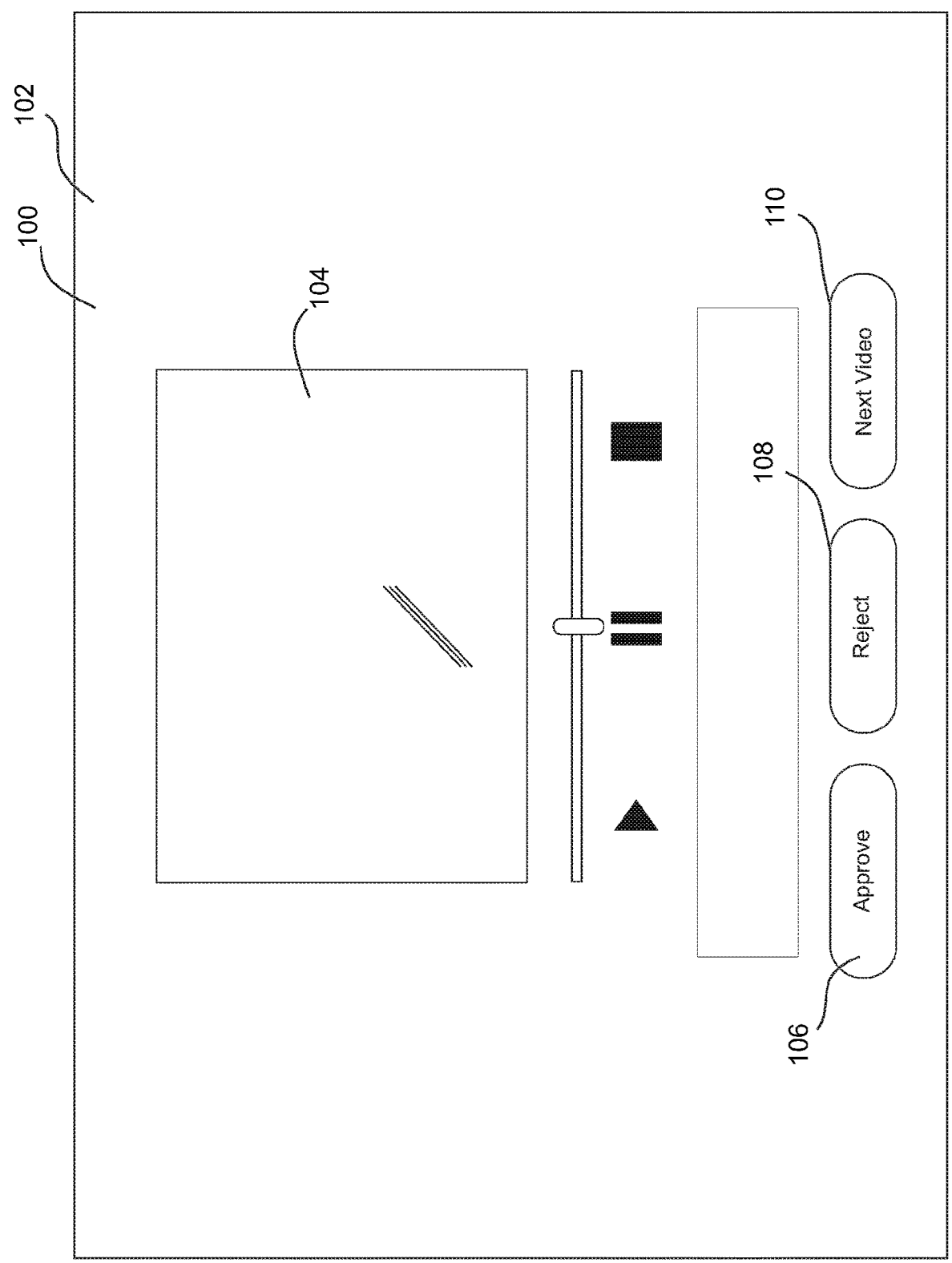
FIG. 9 provides an illustration of a user interface provided by a timeline facility of another preferred embodiment.

In connection with various embodiments, a time line facility provides a user interface 100 as shown in FIG. 9. The user interface 100 provides an approval interface 102 allowing an operator to ensure that upon a user request for a video representation 104 (corresponding to an artwork) there is provided a time line reveal of a special component of the corresponding artwork where the special component of artwork comprising a hidden or inconspicuous component of the artwork. As shown there is provided an approval button 106, a rejection button 108 and a next representation button 110. In this manner an approver (a person) is able to cycle through submitted representations with the use of the time line facility.

Figure 10:
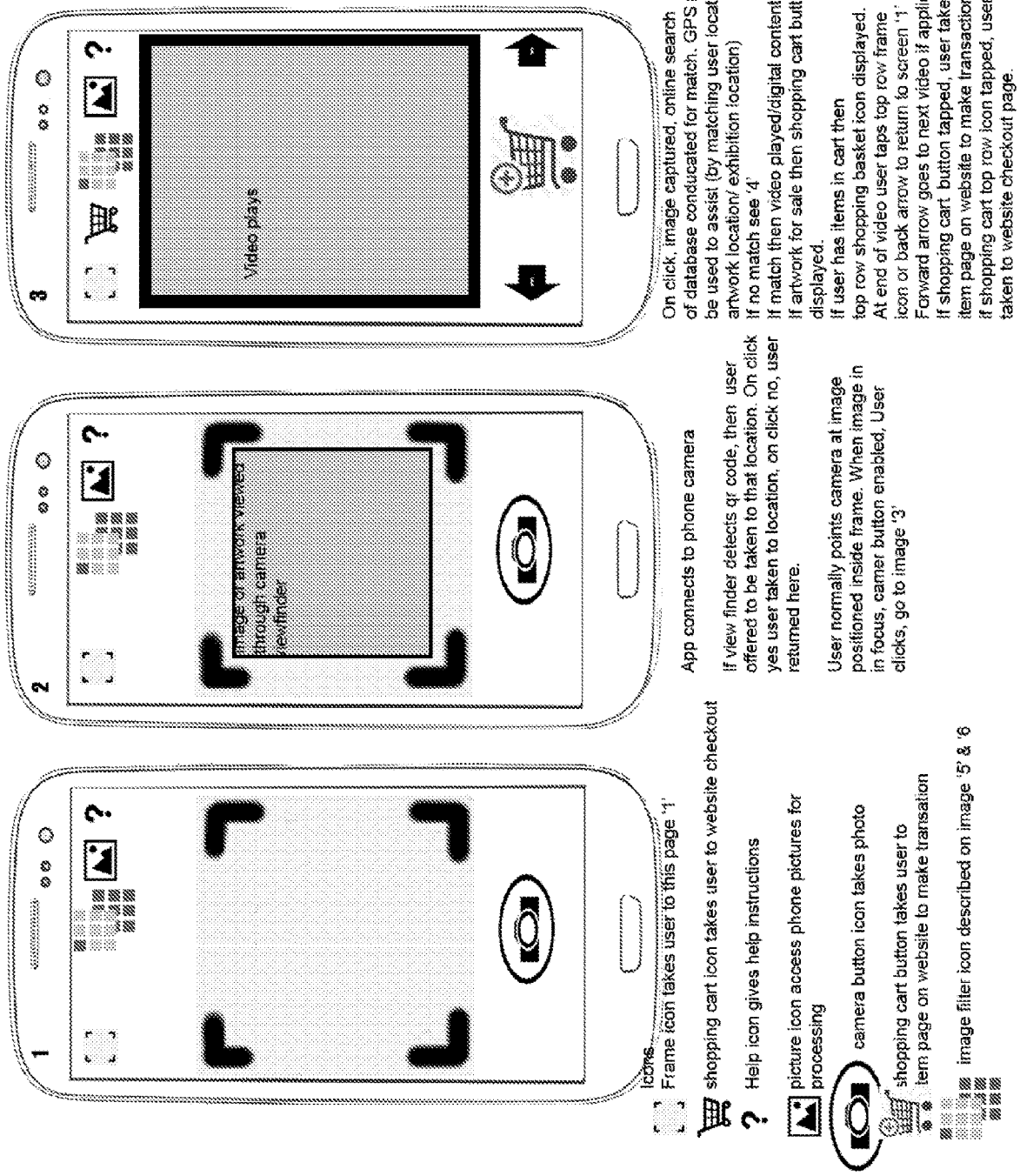
Figure 10C:
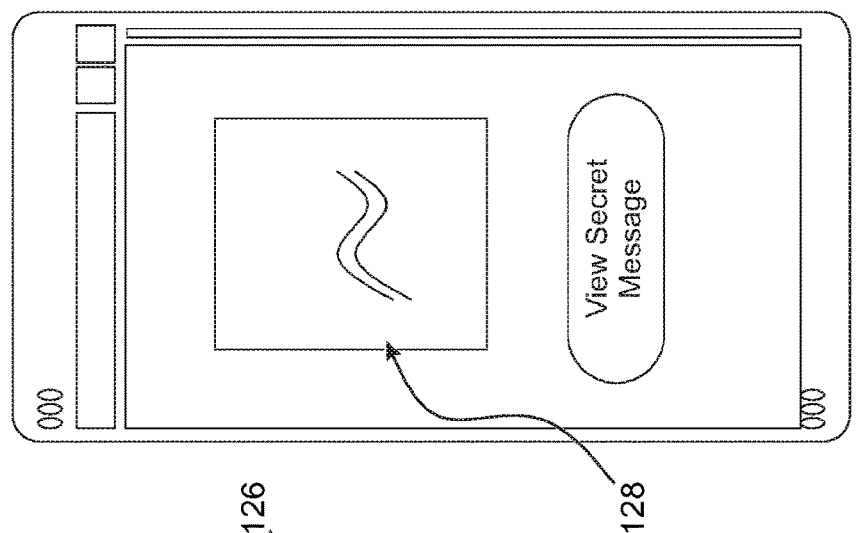
Figure 10B:
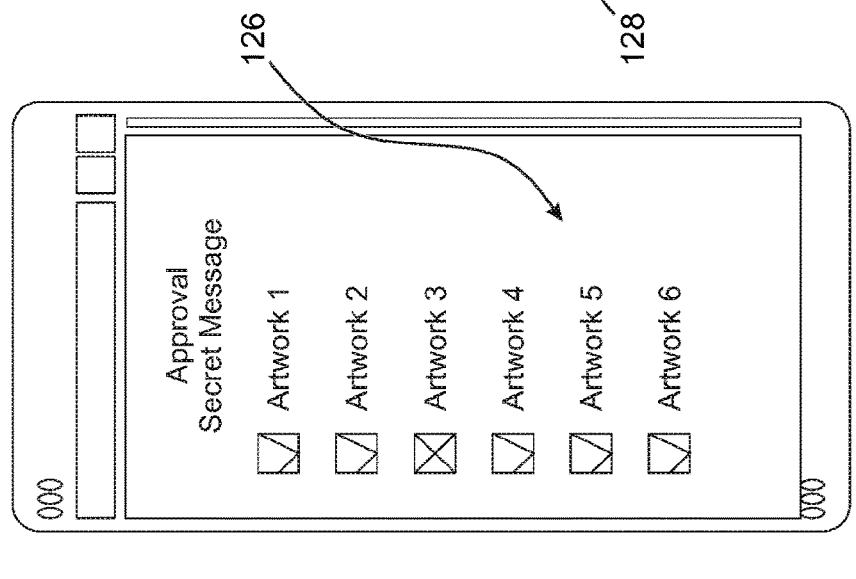
Figure 10A:
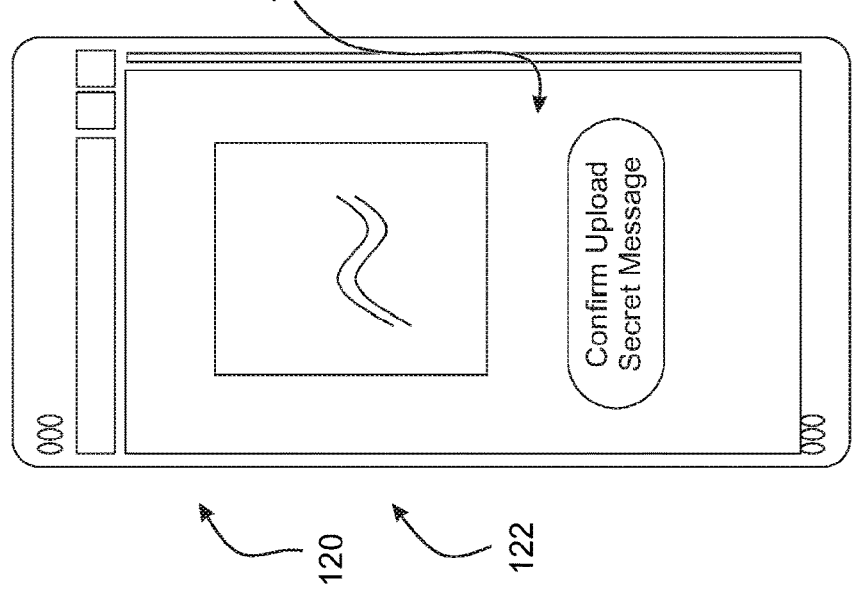

Referring to FIGS. 10a to 10c there is shown a further preferred embodiment of the present invention in the form of a mobile application 120 in a smart phone 122. The mobile application 120 provides an upload facility 124 for receiving representations of one or more artworks by a system user. The upload facility 124 is provided for sending the representations to a timeline facility that is configured for attempting to ensure that representations uploaded by users are able to be used to provide a time line reveal of a special component of the corresponding artworks (as with the embodiment shown in FIG. 1). The mobile application 120 further provides a notification facility 126 for advising the system user of the result of several uploads and the resultant verifications. Using the mobile application 120 the user is able to perform an image match using a viewing facility 128 and retrieve time line reveals of special messages associated with artworks. As before the special component of each artwork comprises a hidden or inconspicuous component of the artwork.

FIGS. 11 to 12 illustrate various approaches that could be used in the system of FIG. 1.

Figure 13:
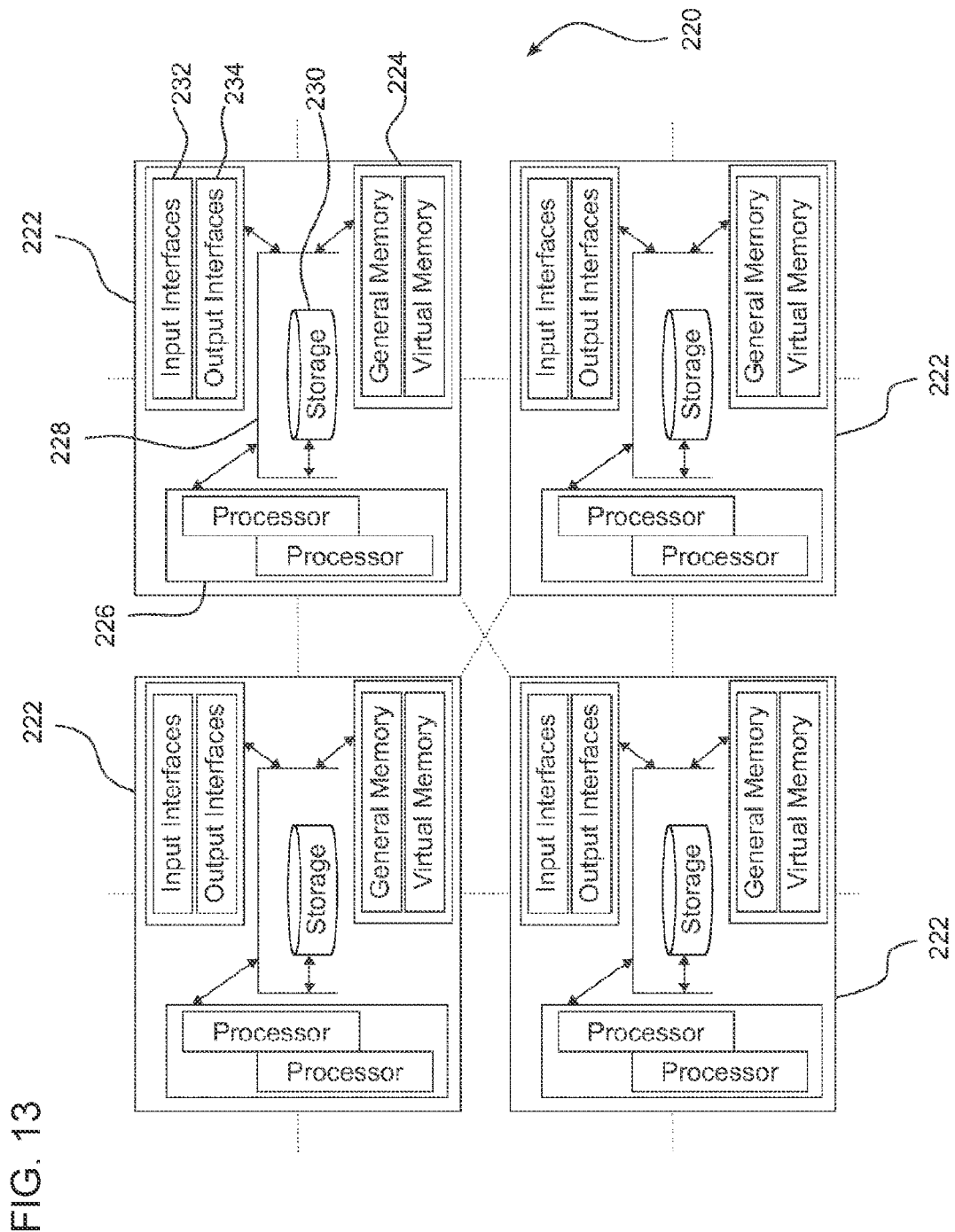
FIG. 13 provides an illustration of a system according to a further preferred embodiment of the present invention.

Referring to FIG. 13 there is shown a schematic diagram of a computer system 220 that is configured to provide preferred arrangements of systems and methods described herein. The computer system 220 is provided as a distributed computer environment containing a number of individual computer systems 222 (computers/computing devices) that cooperate to provide the preferred arrangements. In other embodiments the computer system 220 is provided as a single computing device.

As shown, a first one of the computing devices 222 includes a memory facility 224. The memory facility 224 includes both 'general memory' and other forms of memory such as virtual memory. The memory facility 224 is operatively connected to a processing facility 226 including at least one processor. The memory facility 224 includes computer information in the form of executable instructions and/or computer data. The memory facility 224 is accessible by the processing facility 226 in implementing the preferred arrangements.

As shown each of the computing devices 222 includes a system bus facility 2, a data store facility 230, an input interface facility 232 and an output interface facility 234. The data store facility 230 includes computer information in form of executable instructions and/or computer data. The data store facility 230 is operatively connected to the processing facility 226. The data store facility 230 is operatively connected to the memory facility 224. The data store facility 230 is accessible by the processing facility 226 in implementing the preferred arrangements.

Computer information may be located across a number of devices and be provided in a number of forms. For example the data store facility 230 may include computer information in the form of executable instructions and/or computer data. The computer data information may be provided in the form of encoded data instructions, data signals, data structures, program logic for server side operation, program logic for client side operation, stored webpages and so forth that are accessible by the processing facility 226.

On one level, input interfaces allow computer data to be received by the computing devices 222. On another level, input interfaces allow computer data to be received from individuals operating one or more computer devices. Output interfaces, on one level, allow for instructions to be sent to computing devices. On another level, output interfaces allow computer data to be sent to individuals. The input and output interface facilities 232, 234 provide input and output interfaces that are operatively associated with the processing facility 226. The input and output facilities 232, 234 allow for communication between the computing devices 222 and individuals.

The computing devices 222 provide a distributed system in which several devices are in communication over network and other interfaces to collectively provide the preferred arrangements. Preferably there is provided at least one client device in the system of computing devices 222 where the system is interconnected by a data network.

The client device may be provided with a client side software product for use in the system which, when used, provides systems and methods where the client device and other computer devices 222 communicate over a public data network. Preferably the software product contains computer information in the form of executable instructions and/or computer data for providing the preferred arrangements.

Input interfaces associated with keyboards, mice, trackballs, touchpad's, scanners, video cards, audio cards, network cards and the like are known. Output interfaces associated with monitors, printers, speakers, facsimiles, projectors and the like are known. Network interfaces in the form of wired or wireless interfaces for various forms of LANs, WANs and so forth are known. Storage facilities in the form of floppy disks, hard disks, disk cartridges, CD-ROMS, smart card, RAID systems are known. Volatile and non-volatile memory types including RAM, ROM, EEPROM and other data storage types are known. Various transmission facilities such as circuit board material, coaxial cable, fibre optics, wireless facilities and so forth are known.

It is to be appreciated that systems, components, facilities, interfaces and so forth can be provided in several forms. Systems, components, facilities, interfaces and so forth may be provided as hardware, software or a combination thereof. The present invention may be embodied as computer readable memory, a personal computer and distributed computing environments.

In addition the present invention may be embodied as: a number of computer executable operations; a number of computer executable components; a set of process operations; a set of systems, facilities or components; a computer readable medium having stored thereon computer executable instructions for performing computer implemented methods and/or providing computer implemented systems; and so forth. In the case of computer executable instructions they preferably encode the systems, components and facilities described herein. For example a computer-readable medium may be encoded with one or more facilities configured to run an application configured to carry out a number of operations forming at least part of the present arrangements. Computer readable mediums preferably participate in the provision of computer executable instructions to one or more processors of one or more computing devices.

Computer executable instructions are preferably executed by one or more computing devices to cause the one or more computing devices to operate as desired. Preferred data structures are preferably stored on a computer readable medium. The computer executable instructions may form part of an operating system of a computer device for performing at least part of the preferred arrangements. One or more computing devices may preferably implement the preferred arrangements.

The term computer is to be understood as including all forms of computing device including servers, personal computers, smart phones, digital assistants and distributed computing systems.

Computer readable mediums and so forth of the type envisaged are preferably intransient. Such computer readable mediums may be operatively associated with computer based transmission facilities for the transfer of computer data. Computer readable mediums may provide data signals. Computer readable mediums preferably include magnetic disks, optical disks and other electric/magnetic and physical storage mediums as may have or find application in the industry.

Components, systems and tasks may comprise a process involving the provision of executable instructions to perform a process or the execution of executable instructions within say a processor. Applications or other executable instructions may perform method operations in different orders to achieve similar results. It is to be appreciated that the blocks of systems and methods described may be embodied in any suitable arrangement and in any suited order of operation. Computing facilities, modules, interfaces and the like may be provided in distinct, separate, joined, nested or other forms arrangement. Methods will be apparent from systems described herein and systems will be apparent from methods described herein.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including', 'or' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

Whilst a background to the invention has been provided, it is to be recognised that any discussion in the present specification is intended to explain the context of the present invention. It is not to be taken as an admission that the material discussed formed part of the prior art base or relevant general knowledge in any particular country or region.

The invention claimed is:

1. A computer implemented art gallery system for use by a community of users, the system comprising:
   one or more processors;
   memory operatively connected to the one or more processors, the memory storing a plurality of facilities executable by the one or more processors;
   a data collector for storing representations of artworks that have been created by artists; and
   wherein the one or more processors are configured to:
   via a timeline facility that is stored in the memory, attempt to ensure that, upon user requests for representations of the artworks, each representation is able to be used to provide a time line reveal of a special component that comprises a hidden or obscured component within its respective corresponding artwork, the time line reveal comprising a deconstruction of the corresponding artwork to effectively remove elements associated with the artwork by providing a time based representation of the creation of the artwork in reverse to reveal the corresponding special component existing as part of the representation and having a same appearance and same location as when originally created within the corresponding artwork;
   the special component being a part of the corresponding artwork about which a remainder of the corresponding artwork is based before a completion of the corresponding artwork, and the special component being present in the outward appearance of the representation of the corresponding artwork before said deconstruction.

2. An online art gallery system as claimed in claim 1, wherein the one or more processors are further configured to:
   via a location facility that is stored in the memory, provide at least one physical world location associated with each artwork; and
   via an access facility that is stored in the memory, ensure that the time line reveal associated with each special component is only provided upon a user request, when the user is considered to be associated with the at least one physical world location of the corresponding artwork.

3. An online art gallery system as claimed in claim 2, wherein the one or more processors are further configured to, via the access facility, ensure that the time line reveal of each special component is only provided upon a user request, when the user is considered to be located at or near a location of the at least one physical world location of the corresponding artwork.

4. An online art gallery system as claimed in claim 1, further comprising an automated analyser, that is stored in the memory, for automatically attempting to ensure that, upon user requests for representations of the artworks, each timeline reveal is able to be provided, and wherein the automated analyser includes a text recogniser for determining text associated with special messages.

5. An online art gallery system as claimed in claim 1, wherein the one or more processors are further configured to, via a matching facility that is stored in the memory, match user requests with the representations; and allow user requests to be associated with corresponding artworks.

6. A computer implemented art gallery method for use by a community of users, the method comprising:
   collecting representations of artworks that have been created by artists; and
   attempting to ensure that, upon user requests for representations of the artworks, each representation is able to be used to provide a time line reveal of a special component that comprises a hidden or obscured component within its respective corresponding artwork, the time line reveal comprising a deconstruction of the representation of each artwork to effectively remove elements associated with the artwork by providing a time based representation of the creation of the artwork in reverse to reveal the corresponding special component existing as part of the representation and having a same appearance and same location as when originally created within the corresponding artwork;
   the special component being a part of the corresponding artwork about which a remainder of the corresponding artwork is based before a completion of the corresponding artwork, and the special component being present in the outward appearance of the representation of the corresponding artwork before said deconstruction.

7. A computer implemented art gallery system, the system comprising:
   one or more processors; and
   memory operatively connected to the one or more processors, the memory storing a plurality of facilities including an upload facility, a timeline facility and a notification facility, each of the plurality of facilities executable by the one more processors;
   wherein the one or more processors are configured to:
   via the upload facility, receive representations of one or more artworks by a system user;
   via the timeline facility, attempt to ensure that each of the received representations uploaded by users is able to be used to provide a time line reveal of a special component of the corresponding artwork associated with its respective representation; the special component of each artwork comprising a hidden or obscured component of the artwork being a part of the artwork about which a remainder of the artwork is based before a completion of the artwork; and
   via the notification facility, advise the system user of the result of a verification of whether an uploaded representation includes the time line reveal of the special component, wherein the time line reveal progressively reveals the special component existing as part of the representation and having a same appearance and same location as when originally created in its corresponding artwork.

8. An artwork information system comprising:
   a computer including memory operatively connected to one or more processors, with software having access to a database to store, in connection with a plurality of artworks, a representation of an artwork, and data relating to a video presentation relating to the artwork, said computer being accessible via a publicly accessible computer network and configured to:
   provide user downloadable Apps for installation in users' smartphones, each of said Apps being configured to:
   communicate with said computer via said publicly accessible computer network,
   access a camera of said smartphone for a user to take a photograph of an artistic work, and
   upload said photograph in an artwork image request to said computer via said publicly accessible computer network;

receive via said publicly accessible computer network, artwork image requests uploaded by said Apps containing a photograph of artistic works, in connection with each one of said artwork image requests, perform an analysis to locate and match an artwork within said plurality of artworks in said database, retrieve said data relating to a video presentation relating to the artwork and provide said data relating to a video presentation relating to the artwork to the App that sent the artwork image request for display on the App user's smartphone, so that said App may initiate playback of said video presentation, wherein said video presentation relating to the artwork comprises a time lapse reveal of a hidden or obscured component within the artwork, the time lapse reveal comprising a deconstruction of the artwork by providing a time lapse of the creation of the artwork in reverse to reveal the hidden or obscured component existing as part of the artwork before deconstruction and having a same appearance and same location as when originally created in the artwork.

9. An artwork information system as claimed in claim 8 wherein said data relating to a video presentation relating to the artwork comprises a web page address for the storage location of said video presentation, and said App launches a browser in said smartphone to initiate playback of said video presentation.

10. An artwork information system as claimed in claim 8 wherein said data relating to a video presentation relating to the artwork comprises said video presentation.

11. An artwork information system as claimed in claim 8 wherein if the one or more processors, via a matching facility stored in the memory, fails to locate an exact match of said artwork within said plurality of artworks in said database, said one or more processors is configured to, via the matching facility, provide multiple close matches for the user to browse and manually select a close match therefrom, said close match being communicated by said App to said computer, whereupon said computer retrieves said data relating to the close match and provides said data relating to the close match to the App that sent the artwork image request.

12. An artwork information system as claimed in claim 8 wherein if the one or more processors, via said matching facility, fails to locate an exact match of said artwork within said plurality of artworks in said database, said computer sends a prompt to said App to allow the user to enter the artist name of the artwork, which when entered the computer provides artwork images for the user to browse and manually select therefrom, the user selected artwork image being communicated by said App to said computer, whereupon said computer retrieves said data relating to the user selected artwork image and provides said data relating to the user selected artwork image to the App that sent the artwork image request.

13. An artwork information system as claimed in claim 8 wherein said App stores in said smartphone, a collection of each said photograph of an artistic work taken by a user, wherein the user may select in said App, a photograph from said collection, and upload said photograph in an artwork image request to said computer via said publicly accessible computer network.

14. An artwork information system as claimed in claim 8 wherein said App activates said smartphone camera when initiating playback of said video presentation, in order to afford the user an augmented reality experience.

15. An artwork information system as claimed in claim 8 wherein said database stores in connection with each artwork, GPS location data relating to locations where said artwork is physically displayed.

16. An artwork information system as claimed in claim 15 wherein said App is configured to send with said artwork image requests, GPS location data of said smartphone sending said artwork image request.

17. An artwork information system as claimed in claim 16 wherein said computer proceeds to retrieve said video presentation relating to the artwork only if said GPS location data of said smartphone matches GPS location data relating to one of the locations where the artwork is displayed.

18. An artwork information system as claimed in claim 16 wherein said computer derives and stores in said database, indexed to said artwork, GPS location data relating to locations where said artwork is physically displayed based on received artwork image requests.

19. An artwork information system as claimed in claim 8, wherein said one or more processors are further configured to via an upload facility that is stored in the memory, enable content uploaders to upload to said database, content including representations of artwork, and data relating to a video presentation relating to the representations of the artwork.

20. An artwork information system as claimed in claim 8, wherein said one or more processors are configured to allow a user to communicate via said App to said computer, an intention to purchase an artwork contained in an artwork image request.

* * * * *